US008580122B2

(12) United States Patent
Theodore

(10) Patent No.: US 8,580,122 B2
(45) Date of Patent: *Nov. 12, 2013

(54) HYBRID CHEMICAL/MECHANICAL METHOD AND APPARATUS FOR INACTIVATING AND REMOVING PHARMACEUTICALS AND OTHER CONTAMINANTS FROM WATER

(75) Inventor: Marcus G. Theodore, Salt Lake City, UT (US)

(73) Assignee: Earth Renaissance Technologies, LLC, Salt Lake City, UT (US)

( * ) Notice: Subject to any disclaimer, the term of this patent is extended or adjusted under 35 U.S.C. 154(b) by 223 days.

This patent is subject to a terminal disclaimer.

(21) Appl. No.: 13/068,812

(22) Filed: May 19, 2011

(65) Prior Publication Data
US 2011/0247985 A1 Oct. 13, 2011

Related U.S. Application Data

(63) Continuation-in-part of application No. 12/220,265, filed on Jul. 23, 2008, now Pat. No. 7,967,990, which is a continuation-in-part of application No. 11/203,514, filed on Aug. 12, 2005, now Pat. No. 7,429,329.

(60) Provisional application No. 60/604,675, filed on Aug. 26, 2004.

(51) Int. Cl.
| | | |
|---|---|---|
| B01D 21/00 | (2006.01) | |
| C02F 3/00 | (2006.01) | |
| B01D 21/01 | (2006.01) | |
| B01D 37/00 | (2006.01) | |
| B01D 61/00 | (2006.01) | |
| C02F 1/70 | (2006.01) | |
| C02F 1/72 | (2006.01) | |
| C02F 1/52 | (2006.01) | |
| C02F 1/00 | (2006.01) | |
| B03D 3/00 | (2006.01) | |

(52) U.S. Cl.
USPC .......... 210/719; 210/721; 210/720; 210/757; 210/758; 210/759; 210/724; 210/767

(58) Field of Classification Search
None
See application file for complete search history.

(56) References Cited

U.S. PATENT DOCUMENTS

| | | | | |
|---|---|---|---|---|
| 4,224,148 | A * | 9/1980 | Lindman et al. | 210/714 |
| 4,304,673 | A | 12/1981 | Reynolds et al. | |
| 4,340,489 | A * | 7/1982 | Adams et al. | 210/718 |
| 4,765,911 | A * | 8/1988 | Rasmussen | 210/710 |
| 5,221,312 | A | 6/1993 | Buhidar | |
| 5,466,367 | A * | 11/1995 | Coate et al. | 210/96.1 |
| 5,762,808 | A * | 6/1998 | Peyton | 210/748.04 |

(Continued)

OTHER PUBLICATIONS

"Human Pharmaceuticals in Wastewater Treatment Processes" RedOrbit, http://www.redorbit.com/modules/news/tools.php?tool.

(Continued)

*Primary Examiner* — Christopher Upton
*Assistant Examiner* — Clare Perrin
(74) *Attorney, Agent, or Firm* — Marcus G. Theodore

(57) ABSTRACT

A hybrid chemical/mechanical water treatment plant and method employing rapid sulfur dioxide chemical disinfection and dewatering technology in conjunction with lime and oxidization/reduction agents to removal pharmaceuticals and personal care products from waters to meet operating constraints and environmental permitting restrictions and siting limitations for water treatment.

11 Claims, 8 Drawing Sheets

Layout 2

(56) References Cited

U.S. PATENT DOCUMENTS

| | | |
|---|---|---|
| 5,906,750 A | 5/1999 | Haase |
| 6,077,432 A | 6/2000 | Coppola et al. |
| 2006/0043025 A1* | 3/2006 | Theodore ............... 210/724 |

OTHER PUBLICATIONS

United Nations Environmental Programme Division of Technology Industry, and Econ. Newsleter and Tech. Publ Freshwater Management Series No. 1, Biosolids Management: An Envir.

The 13th Element, John Wiley & Sons, Inc., New York, 2000, Chapter "Oh Shit", pp. 271-273.

Phosphorous: "from urine to fire" by Peter E. Childs; http://www.ul.ie/-CinA/Issue 63/TOC27 Phosphorous.htm Jul. 31, 2004.

Pharmaceuticals, Hormones, and Other Organic Wastewater Contaminants in US Streams 1999-2000 A National Reconnaissance, Environ.Sci. Technol, 36(6) 1202-1211 Mar. 2002 by Dana.

A review of synergistic effect of phot catalysis and ozonation on wastewater treatment by Augustine T.E. et al., Journal of photochemistry and photobiology Abstract, 2005.

Solid phase extraction and HPLC determination of veterinary pharmaceuticals in wastewater by Sandra Babic, et al., Abstract, Aug. 22, 2006.

Welcome to Perchlorate News.com; http//www.perchloratenews.com California and Sweden Sign Agreement to Jointly Develop Biomethane and Other Renewable Fuels at p. 5 of 21, Jul. 23, 2008.

\* cited by examiner

HYBRID CHEMICAL/MECHANICAL METHOD AND APPARATUS FOR INACTIVATING AND REMOVING PHARMACEUTICALS AND OTHER CONTAMINANTS FROM WATER

RELATED APPLICATIONS

This application is a continuation-in-part application of utility patent application Ser. No. 12/220,265, filed Jul. 23, 2008, entitled HYBRID CHEMICAL/MECHANICAL DEWATERING METHOD AND APPARATUS FOR INACTIVATING AND REMOVING PHARMACEUTICALS AND OTHER CONTAMINANTS FROM WASTEWATER, which is a continuation-in-part application of utility patent application Ser. No. 11/203,514, filed Mar. 27, 2007, entitled HYBRID CHEMICAL/MECHANICAL DEWATERING METHOD AND APPARATUS FOR SEWAGE TREATMENT PLANTS, which is a continuation-in-part application of Provisional Patent Application 60/604,675 filed Aug. 26, 2004 entitled "HYBRID CHEMICAL/MECHANICAL DEWATERING METHOD AND APPARATUS FOR SEWAGE TREATMENT PLANTS"

BACKGROUND OF THE INVENTION

1. Field

This invention comprises a hybrid chemical/mechanical treatment method for inactivating and removing pharmaceuticals and other chemical contaminants in waters. More particularly, it relates to a water treatment plant and method employing oxidation/reduction, and acidification/alkalinization cycles using sulfur dioxide and lime for inactivating and removing pharmaceuticals and other contaminants in waters to meet environmental requirements.

2. State of the Art

In the following article entitled "Human Pharmaceuticals in Wastewater Treatment Processes" Posted on: Sunday, 31 Jul. 2005, 03:00 CDT, it states:

"The presence of human pharmaceutical compounds in surface waters is an emerging issue in environmental science. In this study the occurrence and behavior of human pharmaceuticals in a variety of wastewater treatment processes is reviewed. Although some groups are not affected by sewage treatment processes others are amenable to degradation, albeit incomplete. While water purification techniques such as granular activated carbon could potentially remove these pollutants from wastewater streams, the high cost involved suggests that more attention should be given to the potential for the optimization of current treatment processes, and reduction at source in order to reduce environmental contamination.

I. INTRODUCTION

The term "pharmaceutical" covers a wide-ranging class of compounds with substantial variability in structures, function, behavior, and activity developed to elicit a biological effect, they are used in both humans and animals to cure disease, fight infection, and/or reduce symptoms. Many drugs are not fully metabolized in the body and so may be excreted to the sewer system. Numerous pharmaceutical compounds have been shown to pass through sewage treatment plants (STPs) and contaminate the aquatic environment. . . .

The use of other organic pollutants, such as pesticides, has fallen in recent years as new laws have been introduced to minimize their use. However, even if they should prove problematic, pharmaceuticals are unlikely to be restricted in this way, due to their beneficial human (and animal) health effects and economic importance. Indeed, their use is expected to grow with the increasing average age of the population and the publishing of the human genome. They and their metabolites are therefore likely to be found in the environment adjacent to human activity.

The first reports of human drugs in the environment appeared in the late 1970s, although it is not unreasonable to suppose that aquatic pollution from medicinal compounds dates back much further. The growing importance worldwide of reducing potential impacts on water supplies has ensured that this issue has been steadily gaining attention in recent years both within the academic community and among the general public, although it is only with the comparatively recent advent of more reliable and sensitive analytical techniques that detailed research in this area has become possible.

In this article the term "drugs" is taken to exclude both natural and synthetic hormones. While these compounds are an important subgroup of pharmaceuticals, there is already an abundance of work available in the literature on this topic.

From published occurrence data, it seems probable that most if not all urban wastewater is contaminated with medicinal compounds, differing only in the type and abundance of the substances present. The existence of drugs in surface waters, groundwater, and even marine systems has also been confirmed. It is probable that the presence of these compounds stems primarily from the consumption and use of such products rather than from manufacturing.

Medicinal compounds are generally excreted after being partially or completely converted to water-soluble metabolites, but a significant amount of the original substance may also be excreted unchanged. This has previously been regarded as inconsequential because of the dilution received in the sewerage system. However, recent studies on pharmaceutical residues (primarily in Germany) have demonstrated that elimination of high to medium polar pharmaceuticals in municipal STPs is often incomplete, ranging between 60 and 90%. One of the most comprehensive studies of this type was performed by Kolpin et al. who chronicled the detection of over 95 organic chemicals in U.S. streams and rivers. Measured concentrations from this study were generally low (nanograms per liter) and rarely exceeded drinking-water guidelines, drinking-water health advisories, or aquatic-life criteria, although it is worth noting that no such guidelines have been established for the majority of pharmaceutical compounds detected. The detection of multiple organic pollutants was relatively common in this study, with a median of 7 and as many as 38 compounds being found in a given water sample. These results demonstrate the importance of obtaining data on metabolites as well as parent compounds in order to fully understand the fate and transport of individual pollutants in the hydrological cycle.

Compounds having relatively short half-lives would likely survive in only the freshest of sewage sludge samples, but it is important to understand the fate and behavior of these compounds during wastewater treatment in order to assess the likely concentration of contaminants in sludges and effluents, and hence their potential contribution to the pollution of the environment. Some drugs may be removed from wastewater by adsorption onto solids, but can then enter the aquatic environment, in particular groundwaters, via sludge application to land, landfilling, or soil erosion. There have been many reviews on the topic of environmental pollution by drug compounds, all of which note that no quantitative data were found on concentrations of pharmaceuticals in sewage sludge or soil amended with sewage sludge, although some modeling has been attempted. This is surprising, considering that this is a potential route for lipophilic substances to the terrestrial environment. However, it is most probably a consequence the extreme difficulty in extraction and analysis of pollutants from sludge samples on a quantitative basis.

II. DEGRADATION WITHIN STPs

A. Biodegradation

There is an obvious potential for biological degradation (aerobic/anaerobic by micro-organisms) of drug substances leading to a reduction of the parent compounds and/or their metabolites during wastewater treatment. Some biodgradation may also occur during in-pipe transport to the STP, but most will probably occur in the secondary stage of treatment when the compound is exposed to large concentrations of micro-organisms. Biodegradation tests can be performed following test protocols such as the closed bottle test (OECD 301D) or the Zahn-Wellens test (OECD 302B). In general, these tests are carried out with several hundred milligrams of a substance as the carbon source. Therefore, they give answers for only fairly extreme conditions, which, despite their intention, simulate only the maximum potential and not the most probable environmental outcome. Therefore, conclusions on the degradability of drugs in STPs from these tests are of limited value and further research is necessary.

Al-Ahmad et al. assessed the biodegradability of the clinically important antibiotics cefotiam, ciprofloxacin, meropenem, penicillin G, and sulfamethoxazole using the closed bottle test (CBT). None of the test compounds met the criteria for ready biodegradability. Of all the compounds studied, only penicillin G was found to be biodegradable to some degree, with approximately 27% being removed after 28 days. Even when the test was prolonged to 40 days, the removal rate was only increased to 35% indicating the compound was relatively stable.

Kmmerer and Al-Ahmad used the CBT and the modified Zahn Wellens test (ZWT) to examine the biodegradability of the widely used antitumor agents 5-fluorouracil, cytarabine, and gemcitabine. 5-Fluorouracil was not biodegradable in either of these tests. Gemcitabine was biodegraded by 42% in the CBT, but prolonging the test period to 40 days only improved this to 45%. Cytarabine was also partially biodegraded in the CBT (50%). In the ZWT, the biodegradation of gemcitabine was also 50% but only after an adaptation period of 20 days, which is not normally included in such tests. Prolonging the test to 40 days improved the degree of biodegradation to 80%, and in the ZWT the biodegradability was over 95%.

Henschel et al. investigated the biodegradability of paracetamol and methotrexate and the two drug metabolites salicylic acid and clofibric acid. Their results were in agreement with other studies and demonstrated that salicylic acid and (to a lesser extent) paracetamol were biodegradable, whereas clofibric acid and methotrexate were not.

Kmmerer studied the biodegradability of three clinically important antibiotics (ciprofloxacin, ofloxacin, and metronidazole) and found none of the compounds were biodegraded. As a consequence the genotoxicity of these compounds (as measured by the SOS chromotest) remained unaffected after treatment. A more comprehensive review of antibiotics in the environment is available in Hirsch et al. This article describes the analysis of various water samples for 18 antibiotic substances, from several groups, including macrolid antibiotics, sulfonamides, penicillins, and tetracyclines. Both STP effluents and surface-water samples were frequently contaminated with sulfamethoxazole and roxithromycin (a degradation product of erythromycin) at concentrations up to 6 g $L^{-1}$. The highest concentrations detected for tetracyclines and penicillins were 50 and 20 $ngL^{-1}$, respectively. Except for two sites, no contamination by antibiotics was detected from a large number of groundwater samples that were taken from agricultural areas in Germany. This suggests that contamination of groundwater by antibiotics from veterinary applications is relatively minor. Other drugs that have been investigated for their biodegradability include ifosfamide and cyclophosphamide. Both of these compounds exhibited poor biodegradability in the CBT and the ZWT as well as in laboratory-scale activated sludge plants.

Degradation may also occur during bank filtration, if it is used. Heberer et al. found clofibric acid, phenazone, propyphenazone, diclofenac, ibuprofen, and fenofibrate, and two metabolites, jV-methylphenacetin (probably originating from phenacetin) and also a derivative of clofibric acid at concentrations up to the micrograms per liter level in groundwater samples taken from beneath a drinking water treatment plant. These contaminants were found to leach from the neighboring sewage contaminated surface water by bank nitration through the subsoil.

Molecules with long, highly branched side chains are generally less amenable to biodegradation than unbranched compounds with shorter side chains. Unsaturated aliphatic compounds are generally more accessible to biodegradation than saturated analogues or aromatic compounds with complicated aromatic ring structures and sulfate or halogen groups. Examples of the latter are the x-ray contrast media. Since these compounds are exclusively utilized in human medicine, contaminated STP effluents are presumably the sole sources for these compounds in the aquatic environment. The occurrence of four iodinated x-ray contrast media (diatrizoate, iopamidol, iopromide, and iomeprol) in eight German STPs was examined by Ternes et al. These compounds were found to be ubiquitously distributed in the raw sewage and were not significantly degraded or absorbed during the sewage treatment processes and so remained in the aqueous phase. The concentrations of diatrizaote, iopromide, and iomeprol frequently exceeded 1 g $L^{-1}$ in the raw sewages, and these were found at comparable concentrations in the final effluents, with the maximum concentration measured being 15 $gL^{-1}$ for iopamidol.

A similar study by Steger-Hartmann et al. demonstrated that while these compounds are not readily biodegradable, iopromide was amenable to photodegradation. The resulting degradation product (5-amino-N,N'bis(2,3-dihydroxypropyl)-2,4,6-triiodo-N-methyliso-phthalamide) also exhibited a faster rate of photolysis than the parent compound and was further degraded in a test system simulating surface-water conditions. However, the predicted environmental concentration (PEC) in surface water was still high at 2 $L^{-1}$.

Some degradation of iopamidol in activated sludge has also been observed with 85% being transformed into two metabolites. Degradation of the same compound in river water was even more significant, with a half-life of 31 days. However, for other, similar compounds such as diatrizoate the half-life was longer, suggesting there is potential for some compounds to reach rivers and lakes. Although of low toxicity, x-ray contrast media may contribute significantly to the absorbable organic halogen compound (AOX) load in receiving waters. This is of concern because of the high persistence, mobility, and potential of these substances to biotransform to toxic breakdown products.

It is also possible that the biota of a STP may gradually become acclimatized to certain chemicals and therefore may degrade them more effectively given time. For instance Zwiener et al. investigated the biological degradation of pharmaceutical residues (clofibric acid, ibuprofen, diclofenac). In this study both a pilot sewage plant and biofilm reactors operating under oxic and anoxic conditions were run as model systems for municipal sewage treatment, with synthetic sewage and pharmaceuticals in concentrations of 10 $L^{-1}$. Clofibric acid displayed persistence in all cases. The pilot sewage plant and the anoxie biofilm reactor showed comparable results for diclofenac and ibuprofen, which both were partially degraded. A high degree of degradation was found for ibuprofen in the oxic biofilm reactor, which was attributed to adaptation of the biofilm to the residue. This effect has also been show to occur for other compounds, for example, nitrilotriacetic acid, where a period of acclimatization has been shown to be required before biodegradation can begin. In addition, the phenomenon of co-metabolism—the oxidation and degradation of nongrowth substrates by microorganisms—is well documented.

B. Deconjugation

Pharmaceutical compounds are often metabolized in the liver, and as a consequence gluconoride and sulfate conjugates of the parent drugs are excreted. Conjugates of other organic compounds such as steroid hormones have been shown to be readily deconjugated in domestic wastewater and within STPs due to the large amounts of β-glucuridase enzyme present (produced by the fecal bacterium *Escherichia coif*). It seems probable that gluconoride and sulfate conjugates of drug compounds will be degraded by the same process. The effect will be to increase the excreted contribution of the active drugs to sewage and effluents.

C. Partitioning

Partitioning between the aqueous and organic biomass phases is a key component in determining the ultimate concentrations of organic pollutants. Compounds with high log $K_{ow}$ values are known to sorb to sludge, while substances with lower values are more likely to stay in the aquatic phase, depending on the individual compound, and substances sorbing to solids may also be remobilized if they are not strongly bound. It is also well known that bacterial, algal, and fungal cells are capable of adsorbing and accumulation organic pollutants. The activated sludge biomass is able to adsorb organic pollutants such as lindane, and adsorption of these compounds generally fits the Freundlich isotherm. There is a good correlation between compound adsorption and the octanol/water partition coefficient. However, since most drugs are soluble with low log $K_{ow}$ and $K_{oc}$ values, they exist primarily in the aqueous phase and transfer to sewage sludge is probably of only minor concern for the majority of compounds.

There are few studies in the literature detailing potential sorption interactions of drug compounds. Hua et al. studied the removal of chemical oxygen demand (COD), micro-organisms, and selected pharmaceutical compounds by trickling wastewater through a sandy soil from the Rhine valley in glass columns. The sewage contained low concentrations of at least 10 different pharmaceuticals and x-ray media. Some of the compounds were removed by adsorption onto sand and/or biodegradation. The rate of removal varied from complete (e.g., ibuprofen and naproxen), to almost none, for several x-ray contrast media. Some of the compounds were removed as effectively by this method as by conventional sewage treatment.

Jones et al. estimated physicochemical values for the top 25 pharmaceuticals in England in 2000 using a computer model. Of the top 25 compounds, 16 had low predicted sorption potential and were thought unlikely to bind to sludge solids. Five compounds had medium sorption potential and two (quinine sulfate and mefenamic acid) were predicted to have a high capacity to bind to solids (no data were available for the remaining two compounds). Although this study indicated some removal to solids for mefenamic acid, it did not demonstrate that all would be removed and in fact this compound has been found to be present in sewage effluent. The concentrations of mefenamic acid in three sewage effluents as well as upstream and downstream of the effluent discharge point have been reported by Hilton and Thomas. The report does not, however, quote influent concentrations, so it is impossible to say how much was lost during treatment. For instance, if the concentration in the influent was double the concentration in the effluent, this would indicate a potentially high binding capacity (or biodegradation rate). A second paper by Soulet et al. indicates a high degree of variation in the removal of mefenamic acid depending on the STP studied. Some exhibited a high removal, while others showed almost none indicating the importance of design and operational factors and/or climatic conditions. This means a definitive conclusion cannot be reached with regard to the removal rates of this drug within STPs, other than that it is potentially highly dependent on plant design, wastewater characteristics, and, most importantly, the operational regime.

Bester studied the fate of the antimicrobial triclosan (2,4, 4'-trichloro2'-hydroxyphenyl ether) in a German sewage treatment plant that processed 200,000 $m^3$ wastewater per day. The concentrations in the influent (~1000 ng $L^{-1}$) were compared to those in the effluent and the sludge, and a mass balance of the works was prepared. Thirty percent of the triclosan was found to sorb to the sludge with weak bonds, but only about 5% of the influent concentration was found in the effluent. Thus, most of the incoming material was not recovered as the parent compound, and the authors suggest that it is likely that it is transformed to other metabolites or unrecovered bound residues. This compares well with a study by Singer et al., 109 who, during a field study, attributed the fate of triclosan in a wastewater treatment plant to be 79% biological degradation, 15% sorption to sludge, with 6% being discharged to the receiving surface water. Despite the high overall removal rate, the concentration inn the wastewater effluents were in the range of 42-213 ng $L^{-1}$, leading to concentrations of 11-98 ng $L^{-1}$ in the receiving rivers.

A recent review of veterinary drugs by Tolls suggests that mechanisms other than hydrophobic partitioning play a significant role in sorption of animal (and potentially human) medications. A number of hydrophobicityin dependent mechanisms such as cation exchange, cation bridging at clay surfaces, surface complexation, and hydrogen bonding also appear to be involved. These processes are not accounted for by organic carbon normalization, suggesting that this data treatment is conceptually inappropriate and fails to describe the sorption behavior. In addition, some drug compounds may be anions at the pH values in STPs and the environment. This will lower the effective $K_{ow}$ and decrease their sorption potential.

D. Removal During Sludge Treatment

Drugs may also be degraded during sewage treatment processes. Many pharmaceuticals are not thermally stable and so might be expected to break down during processes such as composting due to heat (as well as chemical and biodegradation). A study by Guerin investigated soil composting as an alternative to incineration for the treatment of a silty clay soil that had become contaminated with residues of Probenecid (an anti-gout drug) and Methaqualone (a barbiturate substitute no longer available due to harmful side effects). In pilot scale trials, Probenecid was reduced from 5100 mg $kg^{-1}$ to <10 mg $kg^{-1}$ within 20 weeks during mesophilic treatments. The study also confirmed that thermophilic composting was effective under field conditions. In the full-scale treatment, 180 tons of soil was composted. Initial concentrations of the major contaminants in the full-scale compost treatment facility for Probenecid and Methaqualone were 1160 mg kg$^{-1}$ and 210 mg kg$^{-1}$, respectively. Probenecid concentration reached the target level of 100 mg kg$^{-1}$ in 6 weeks, and removal of Methaqualone to <100 mg kg$^{-1}$ was achieved after 14 weeks. The study concluded that composting was effective in reducing soil concentrations of Probenecid and Methaqualone residues to acceptable values and hence is a technology that has potential application in the remediation of pharmaceutical contaminants in sludge/soil, although further testing using other drug compounds and soils would be necessary.

E. Photodegradation

Several pharmaceutical compounds have been shown to degrade due to the action of sunlight. The most extensively studied of these compounds is the analgesic/anti-inflammatory drug diclofenac, which has been shown to degrade in the aquatic environment due to ultraviolet (UV) light. Other compounds such as the topical antimycotic drugs naftifine, sulbentine, cloxiquin, tolnaftate, and chlorphenesin have also been shown to be light sensitive, and an overall elimination rate of 0.03 day$^{-1}$ due to photochemical degradation was observed for triclosan in the epilimnion of Lake Greifensee by Singer et al.

Andreozzi et al. carried out a monitoring survey of STP effluents in Italy, France, Greece, and Sweden and found more than 20 individual pharmaceuticals. The photodegradation of six compounds (carbamazepine, diclofenac, clofibric acid, ofloxacin, sulfamethoxazole, and propranolol) was tested. Carbamazepine and clofibric acid were found to have the longest half-lives (of the order of 100 days at the most northerly areas sampled), whereas sulfamethoxazole, diclofenac, ofloxacin, and propranolol were found to undergo faster degradation with half-lives of 2.4, 5.0, 10.6, and 16.8 days, respectively. For almost all the studied compounds, except propranolol, the presence of nitrate ions in aqueous solutions resulted in a reduction of the measured half life. This effect may be ascribed to the formation of HO radicals due to photolysis of nitrate. The authors point out that besides pharmaceutical residues, other species targeted by OH radicals, such as naturally occurring organic constituents, are present in rivers and lakes. For this reason, the effect caused by nitrate on the degradation rates of the pharmaceuticals found in this study should be interpreted only as a tendency if no other organic molecules but the substrate are present in the test solution.

A more complex situation arose when humic acids were added to the solutions containing the pharmaceuticals. Humic acids are known to exert two opposite effects on the rate of photodegradation of organic molecules in water. Due to their capability to absorb UV radiation in a broad range of wavelengths, they can reduce the available energy for the organic molecules present in the solution, thus acting as an inner filter (thus decreasing photodegradation). At the same time, the molecules of humic acids submitted to UV irradiation are promoted to a transient, excited state, in which they may react with oxygen in the solution, forming reactive species as singlet oxygen, or react directly with other organic species, thus promoting their phototransformation. The overall effect of humic acids on the phototransformation rate of an organic substance will therefore depend on the balance between these two opposite contributions. In the study, humic acids were found to act as inner filters toward carbamazepine and diclofenac, but as photosensitizers toward sulfamethoxazole, clofibric acid, oflaxocin, and propranolol.

Buser et al. established that up to 90% of diclofenac entering a Swiss lake was degraded with a half-life of less than 1 h$^{-1}$. Incubation of lake water, fortified with diclofenac, exhibited no reduction in the dark, suggesting minimal chemical and biological degradation. However, when the fortified water was exposed to sunlight, rapid degradation was observed that indicated that this was the result of photodegradation. The use of sewage lagoons may therefore increase the removal of light sensitive compounds as demonstrated by Kreuzinger et al., who showed that removal rates of diclofenac were only 14% with just activated sludge treatment, while after further polishing in a sewage lagoon concentrations decreased to below the limits of detection. Adsorption and biodegradation were ruled out as the cause of the decrease, as there was no developed/active sludge flock in the lagoon, leaving photodegradation as the most likely cause.

Latch et al. studied the photochemical fates of the histamine $H_2$ receptor antagonists cimetidine and ranitidine. Each displayed high rates of reaction with both single oxygen and hydroxyl radicals, with two transient oxidants being formed in sunlit natural waters. Ranitidine was degraded in direct photolysis experiments with a half-life of 35 min under noon summertime sunlight at 45° latitude, while cimetidine was shown to be resistant to direct photolysis. The results of these experiments, combined with the expected steady state near-surface concentrations of single oxygen and hydroxyl radicals, indicate that photo-oxidation mediated by single oxygen radicals is the likely degradation pathway for cimetidine in most natural waters, while photodegradation by direct photolysis is expected to be the major pathway for ranitidine. However, the extent of photo-induced degradation of pharmaceuticals can vary significantly for different pharmaceuticals, and it strongly depends on the aqueous constituents (such as humic and fulvic acids) present in solution. In addition, light levels within STPs are likely to be much lower than in the environment (effectively zero), due to the higher solids content. Indeed, Koutsouba et al. found diclofenac to be widespread in Greek domestic sewage effluent, with concentrations in effluent ranging from 10 to 365 ngL$^{-1}$. Given the inherent photosensitivity of this compound, its presence in sewage effluent would seem to indicate that photodegradation is highly unlikely to take place within STPs where light penetration is minimal at best.

III. FATE OF COMPOUNDS WITHIN SEWAGE WORKS

Because of the complexity of most environmental matrices (i.e., wastewater and sludge samples), analytical techniques with very high resolving power are needed to provide the required sensitivity and detection limits. Metcalfe et al. analyzed for residues of selected prescription and nonprescription drugs in samples of influent and effluent from 18 STPs across 14 municipalities in Canada. Several neutral and acidic drugs were detected in effluents, including analgesic/anti-inflammatory agents, lipid regulators, and antiepileptics. Drugs such as ibuprofen and naproxen, as well as salicylic acid (the metabolite of aspirin), were often detected in final effluents at micrograms per liter concentrations. The rates of elimination of ibuprofen and naproxen appeared to be elevated in STPs with hydraulic retention times of over 12 h, indicating that this could be a factor in increasing drug removal rates, although it is more likely factors that affect HRT (such as SRT) were responsible for the observed effect.

The lipid regulator clofibric acid and the analgesic drug diclofenac were not detected in any final effluent samples. This is not consistent with data from European studies which often report their presence. This may reflect different prescribing practices in the two areas. For instance, the precursors to clofibric acid (e.g., clofibrate) are not widely prescribed for use as lipid regulators in Canada.

Soulet et al. studied five acidic drugs (clofibric acid, ibuprofen, ketoprofen, mefenamic acid, and diclofenac) at three STPs in order to determine their behavior during treatment. Each plant consisted of a physical and a biological treatment stage, with one of the plants also having additional treatment before the biological treatment stage. In addition, two of the three received wastewater from the pharmaceutical industry. The results demonstrated that four of the pharmaceuticals (clofibric acid, ketoprofen, mefenamic acid, and diclofenac) are not well removed by treatment in Swiss STPs. Indeed, although recovery rates in the influent were low (35 10%, versus 86 8% for the effluent), possibly due to interferences during detection, the maximum concentration for mefenamic acid in the effluent determined was 1.0 g/$L^{-1}$. This level of contamination indicates it would also be present in surface waters. However, it should be noted that the removal efficiencies for this compound (as well as the others in the study) varied depending on the STP in question. In one instance there was more than twice the amount in the influent as there was in the effluent, while in other cases more of the compound was found in the effluent than in the influent, perhaps because of remobilization of previously absorbed material from biological solids retained in the system. This indicates that removal of these compounds is not uniform and may be dependent on a number of factors.

Kanda et al. utilized a number of analytical procedures to investigate the presence of a number of pharmaceuticals in six UK sewage treatment works. The work established that many pharmaceuticals occurred in influent at nanograms per liter levels and were removed by wastewater treatment processes. Ibuprofen was detected in all influent samples as well as in all but one effluent sample. Removal of ibuprofen by the different STPs was generally between 80 and 100%, with the exception of one STP where removal was poor (14.4 to 44%). Similar results were also reported by Jones et al., who found five drug compounds (ibuprofen, paracetamol, salbutamol, propranolol HCl, and mefenamic acid) present at nanograms per liter levels in a large English STP.

Samples from eight STPs in southern Ontario, Canada were analyzed by Lee et al. for 11 acidic drug compounds: salicylic acid, clofibric acid, ibuprofen, acetaminophen, gemfibrozil, fenoprofen, naproxen, ketoprofen, diclofenac, fenofibrate, and indomethacin, as well as the antibacterial agent triclosan. While clofibric acid, acetaminophen, fenoprofen, and fenofibrate were not detected, the other eight compounds were found in nearly all the influent and effluent samples, from low micrograms to low nanograms per liter levels. Eight STPs removed from 0 to 98% of these drugs from the influent.

Measured concentrations of nine pharmaceutical and personal care products (PPCPs) in samples from two surface-water bodies, a sewage treatment plant effluent, and various stages of a drinking-water treatment plant in Louisiana, and from one surface-water body, a drinking-water treatment plant and a pilot plant in Ontario, Canada, were reported by Boyd et al. Naproxen was detected in Louisiana sewage treatment plant effluent at 81-106 ng$L^{-1}$ and in Louisiana and Ontario surface waters at 22-107 ng$L^{-1}$. Triclosan was detected in Louisiana sewage treatment plant effluent at 10-21 ng$L^{-1}$. Of the three surface waters sampled, clofibric acid was detected in Detroit River water at 103 ng$L^{-1}$, but not in Mississippi River or Lake Pontchartrain waters. None of the other target analytes were detected above their method detection limits.

Based on results at various stages of treatment, conventional drinking water treatment processes (coagulation, flocculation and sedimentation) plus continuous addition of powdered activated carbon at a dosage of 2 mg $L^{-1}$ did not remove naproxen from Mississippi River water. However, chlorination, ozonation, and dual-media filtration processes reduced the concentration of naproxen below the limit of detection in Mississippi River and Detroit River waters and reduced clofibric acid in Detroit River waters. Results of this study demonstrate that existing water treatment technologies can effectively remove certain pharmaceuticals. In addition, the study demonstrates the importance of obtaining data on removal mechanisms and by-products associated with pharmaceuticals and other endocrine-disrupting chemicals in drinking-water and sewage treatment processes.

The most pressing concern with regard to antibiotics in the environment is, at present, the continued spread of resistance of bacterial pathogens to the many compounds presently used to control infections, a phenomenon that may be assisted by repeated doses at the low concentrations found in the environment. Antibiotics also have the potential to affect the microbial community in sewage treatment systems, and the inhibition of wastewater bacteria has the potential to seriously affect organic matter degradation as well as nitrification and denitrification. Although one study has shown that bacteria isolated from treated sewage and digested sludge were generally not significantly more resistant to antibiotics than isolates from raw sewage, others have shown the opposite. Therefore, the occurrence of antibiotics in sewage effluent and receiving waters, as well as their potential effects on exposed microbial populations, is of interest and concern.

Certain antibiotics may also have a toxic effect. For instance, Hartmann et al. identified fluoroquinolone antibiotics as the main source of genotoxicity in hospital wastewater using a bacterial short-term genotoxicity assay, based on a umuGlacZ fusion gene (umuC assay). The ratio of theoretical mean wastewater concentrations (derived from consumption data) and lowest-observable-effect concentrations of selected pharmaceuticals were used to calculate umuC induction probabilities. The fluoroquinolone antibiotics ciproxin and noroxin exhibited the highest induction probabilities and exceeded all other investigated drugs by at least one order of magnitude in significance. Antineoplastic drugs, originally thought to be the main effectors, were found to be of marginal significance using this technique. These findings were further supported by investigation of urine samples from hospital patients with the umuC assay. The determination of ciprofloxacin in hospital wastewater by reverse-phase high-performance liquid chromatography and fluorescence detection revealed concentrations from 3 to 87 g$L^{-1}$. Ciprofloxacin concentrations and umuC induction factors in 16 hospital wastewater samples exhibited a log-linear correlation. The authors suggest that the previously measured umuC genotoxicity in the wastewater of the hospital under investigation is caused mainly by fluoroquinolone antibiotics, especially by ciprofloxacin. However, follow-up work by Hartmann et al. suggested this could also be due to the presence of additional mutagens that are yet to be identified.

Ternes et al. assessed the removal of pharmaceuticals, iodinated x-ray contrast media, and musk fragrances from municipal wastewater using a pilot ozonation and UV-disinfection plant receiving effluent from a German STP. In the original STP effluent, 5 antibiotics (0.34-0.63 Mg $L^{-1}$), 5 beta-blockers (0.18-1.7 g $L^{-1}$), 4 antiphlogistics (0.10-1.3 g $L^{-1}$), 2 lipid regulator metabolites (0.12-0.13 g $L^{-1}$), the antiepileptic drug carbamazepine (2.1 g $L^{-1}$), 4 ICMs (1.1-5.2 g $L^{-1}$), the natural estrogen estrone (0.015 g $L^{-1}$), and 2 musk fragrances (0.1-0.73 g $L^{-1}$) were detected. X-ray contrast media were present with the highest concentrations (diatrizoate, 5-7 g $L^{-1}$; iopromide, 5.2 g $L^{-1}$).

By applying 10-15 g $L^{-1}$ ozone (contact time 18 min), all the pharmaceuticals investigated as well as musk fragrances (HHCB, AHTN) and estrone were no longer detected. However, ICMs (diatrizoate, iopamidol, iopromide, and iomeprol) were still detected in appreciable concentrations. Even with a 15 mg $L^{-1}$ ozone dose, the ionic diatrizoate exhibited a maximum removal efficiency of only 14%, while the nonionic media were removed by more than 80%. Advanced oxidation processes ($O_3$/UV-low-pressure mercury arc, $O_3''/H_2O_2''$), which were nonoptimized for wastewater treatment, did not lead to a significantly higher removal efficiency for the x-ray media than ozone alone.

This work demonstrated that it may be possible to remove pharmaceuticals and other organic contaminants from sewage using available technologies. It is not clear, however, how much upgrading STPs in this way would cost. Capital and operational costs are high for ozonation plants and other tertiary treatment options, and if water companies do not see a benefit to such investment they are unlikely to be inclined to treat wastewater in this way.

IV. DISCUSSION

Drugs in the environment are an emerging environmental issue. Although some contamination may come from landfill leachates or via the incorrect disposal of waste drugs, these are likely to be relatively small sources of pollution. Most human pharmaceuticals are released after excretion from the patient or, to a lesser extent, in aqueous waste produced by manufacturing. Sewage treatment plants may therefore be reasonably expected to be the main point of collection and subsequent release into the environment. However, conventional sewage treatment facilities were never designed to deal with pharmaceutical compounds, and due to their highly variable physical and chemical properties, the efficiencies by which they are removed may vary substantially. It is also not known if sewage treatment facilities could be cost-effectively modified to reduce pharmaceutical emissions.

Another factor to consider is the sheer number of compounds involved. A pharmaceutical may be described as any chemical used for the diagnosis, treatment (cure/mitigation), alteration, or prevention of disease, health condition, or structure/function of the body. There are literally thousands of compounds that maybe taken for medicinal purposes throughout the world, with more than 3000 individual pharmaceutical substances currently licensed for use in the United Kingdom alone. Thus, the terms "pharmaceutical," "pharmaceutically active compounds" (PhAC), and "pharmaceuticals and personal care products" (PPCP) are somewhat general, catch-all terms for an extremely broad group of compounds with wide-ranging physical and chemical properties. Clearly it is not feasible to monitor sewage for all the compounds that might potentially be found. Therefore, some form of selection process is needed to narrow down interest to those compounds likely to do most harm, through either their sheer volume of use (e.g., painkillers such as ibuprofen) or their potential for toxicity (e.g., anticancer drugs). This could conceivably be achieved via computer modeling.

Although there is a paucity of data on the behavior of pharmaceuticals, their fate is likely to be dependent on their physicochemical properties (e.g., chemical structure, aqueous solubility, octanol/water partition coefficient, and Henry's law constant). Their behavior during wastewater treatment will therefore comply with the pathways outlined by Meakins et al., and there have been attempts to model fate and behavior in the literature.

In general, the more hydrophobic a chemical is, the greater the amount that will accumulate in the solid phase (e.g., sludge), and the more hydrophilic, the greater the amount that will stay in the aqueous phase. The following guide to the significance of sorption can be used:

Log $K_{OW} < 2.5$ Low sorption potential
Log $K_{OW} > 2.5$ but $< 4.0$ Medium sorption potential
Log $K_{OW} > 4.0$ High sorption potential For instance, some polybrominated diphenyl ethers with high log Kow values of around 9 are known to partition to sludge, whereas steroid estrogens with lower log $K_{ow}$ values of 2-4 may sorb to solids or stay in the aquatic phase depending on the individual compound. Some workers, however, have expressed doubts over the usefulness of this method with regard to pharmaceuticals.

The $K_{oc}$ is also an important parameter which can be used when considering potential losses of a chemical due to sorption. As with $K_{ow}$ values, the higher the log $K_{oc}$, the higher is the likelihood that a compound will sorb to matter containing organic carbon such as suspended solids as well as the nonpolar fats and lipids, mineral oils, greases, and surfactants generally present in domestic sewage. Those with lower values will tend to remain in the liquid phase and may be more easily leached from sludge or sediments. However, it is worth noting that predicted concentrations of drug compounds in sludge based on $K_{ow}$, sludge-water partition coefficients ($K_d$), or acid-base constants CpKa) and measured in effluent vary extensively. This may be because the values were calculated using equations originally designed for lipophilic compounds containing no functional groups.

The extent to which individual compounds are accumulated or degraded will be influenced both by the properties of the compound in question and of the unit treatment process employed at the STP itself; individual compounds may be lost at any one of several treatment stages. Typical sewage treatment usually consists of primary sedimentation followed by secondary (biological) treatment and final sedimentation. There may also be facilities for removing nutrients (e.g., nitrogen and phosphorus) and/or pathogens. This may include processes with anaerobic and anoxic zones or tertiary treatment processes such as slow sand filtration and in some cases UV disinfection or chlorination. Treatment of sewage sludge to reduce pathogens and pollutants is also often mandatory.

Typically, there is very little elimination of organic micropollutants from the preliminary treatment of wastewater, and it is also unlikely that many pharmaceutical compounds will be removed during screening or primary sedimentation. As there is little biological activity, any pollutant removal at this stage will rely on both the tendency of the individual drug to adsorb to solids and the degree of suspended solid removal from the primary sedimentation tank. The removal of organic compounds may also be affected by factors such as pH, retention time, temperature, and amount of solids present, as has already been demonstrated for metals. Normally there is little change in dissolved polar organics, such as pharmaceuticals, at this point, so little to no loss of polar drugs may be expected here.

Activated sludge and trickling, filters are the principle types of secondary biological treatment usually used following primary sedimentation. Losses of drugs in both processes may be by the same mechanisms as other organic micropollutants and include adsorption to and removal in waste sludge and/or biological or chemical degradation and biotransformation. Little loss by volatilization during aeration is expected, but field data suggest that activated sludge removes greater amounts of pharmaceutical compounds than percolating filters, probably due to the greater bacterial activity in the former.

Since sewage treatment plants are the principal method by which human pharmaceuticals enter the environment there are, theoretically at least, a number of potential opportunities to control their release. For example, certain compounds have been shown to be removed more efficiently by reducing the sludge loading rate (SLR) and/or increasing the hydraulic retention time (HRT). Both these factors are ultimately determined by the sludge age ($\theta c$) of the plant. Increasing sludge age results in a reduction of the SLR and an increase in HRT. This enables populations of slower growing bacteria to develop and also serves to increase the potential for the acclimatization of the population to the compounds encountered. This change in the bacterial population with time means any chemicals in the sewage are exposed to a greater array of bacteria and bacterial enzymes, increasing the likelihood that they will be degraded to less harmful compounds; however, recalcitrant polar organics may still pass through.

STPs employing nitrification and denitrification also exhibit significantly lower concentrations of drugs such as ibuprofen and naproxen in their effluent. This is probably a consequence of the diverse bacterial compositions within a nitrifying and denitrifying system. Nitrification is a highly oxygenated process, while denitrification requires anoxic and anaerobic conditions. These differences give rise to a sequence of differing bacterial populations, which may act synergistically and result in a greater degree of degradation being achieved. For example, a compound may be partially biodegraded during nitrification, with the resulting product then degraded fully in the denitrified system.

Utilization of nitrification-denitrification and increasing the sludge age of the majority of sewage treatment plants would (along with most other options) be likely to involve a number of associated environmental costs in terms of resource and energy consumption, which would need to be balanced against the potential benefits of a reduced pharmaceutical load in the effluent. However, most modern treatment facilities already have these systems in place (often in conjunction with biological phosphorus removal) to control nutrient release. Therefore the cost would be offset somewhat by existing legal requirements. It may be that moves to limit nutrients to receiving waters have also reduced pharmaceutical and other related contaminants. However, there may be scope to optimize pharmaceutical removal at little extra cost.

In order to develop effective management strategies to minimize the risks of the release of compounds to the environment, it is necessary to fully understand the potential sources and the subsequent fate and behavior of the compounds in question, as well as the associated costs and benefits of effecting a change in treatment options. This necessarily includes consideration of how local conditions are likely to influence their impact. Strategies that are developed also need to be evaluated in terms of their overall effectiveness, including both environmental and economic considerations. While the latter are likely to be easily identified (although at present there are no economic or legal incentives for water companies to remove medicinal compounds from wastewater), the environmental aspects are more difficult to determine.

Drugs left in the effluent after primary and secondary treatment may be eliminated by tertiary treatment. However, in most countries only a small proportion of sewage treatment facilities have these adaptations. Advanced treatment techniques such as ozonation and membrane treatment have been shown to remove pharmaceuticals to below detection limits in a water treatment works, but how effectively they do so varies with the treatment conditions employed. In addition, these processes have not been applied to the treatment of wastewater and would prove costly and pose maintenance problems if they were used.

Those compounds not removed in sludge or degraded during treatment will be released in the final effluent with unknown effects on the receiving aquatic systems. Compounds that do sorb to the solid phase (such as the fluoroquinolone antibiotics) still have the potential to return to the environment via the landfilling of sludge or the application of biosolids as a fertilizer/soil conditioner. In each case, compounds could be removed via leaching and enter groundwater and/or surface water. This scenario is likely to be mitigated to some extent by the treatment that sewage sludge must undergo before disposal. Various techniques are utilized, all of which may influence the loss, or potential formation, of organic contaminants. The main form of treatment is digestion (anaerobic or aerobic). Temperatures are usually elevated during these processes, and nonthermally stable compounds (such as many drugs) may be broken down at this point; however, there is no evidence regarding the fate of pharmaceutical compounds before and after sludge digestion. While disposal of sludge to land is desirable for a variety of reasons, both environmental and economic, concern over pollutants has led many to be cautious over its use, and as yet the data are inadequate to assess the need for land utilization guidelines for organic contaminants such as pharmaceuticals. As analytical surveys for organic residues are expensive, environmental modeling may assist in identifying pharmaceuticals that should potentially be analyzed in sewage sludge and/or treated soils.

Where pharmaceuticals are released into the environment there is the risk of exposure to humans via potable water supplies. Although the associated risks are likely to be relatively minor, the increasing demands on the worlds freshwater supplies will likely lead to greater incidences of indirect and direct water reuse situations, and the potential for adverse effects should not be overlooked, especially since little is known regarding the environmental or human health hazards that might be posed by chronic, subtherapeutic levels of pharmaceutical substances or their transformation products. In addition, the presence of pharmaceuticals, however small, will likely increase the general public's already negative attitude to water reuse. This is because it is impossible to prove there will never be any negative effects from their presence. For example, a water reuse scheme in San Diego, Calif., recently failed precisely because the onus was put on the operator to prove the negative regarding quality, health, and local media effects, even though none were detected during the scheme.

To conclude, if pharmaceuticals are proved to be problem pollutants, it is theoretically possible that contemporary STPs can be upgraded to deal with them but in practice it is very unlikely that this will be economical. Therefore, controlling pollution sources (such as disposal practices and therapeutic usage) may prove a more effective tool to control this problem, since prevention of contamination is generally preferable to remediation.

V. CONCLUSIONS

Pharmaceuticals are used in large amounts in human (and veterinary) medicine and reach the aquatic environment mainly through sewage treatment systems, where their concentrations can reach micrograms per liter levels.

Although some predictions can be made based on their physical and chemical properties, pharmaceuticals display a variety of removal efficiencies during wastewater treatment and their fate and behavior are not clear.

There is little experimental evidence showing levels of pharmaceutical compounds in sewage effluent or sludge and even less showing they should be of concern. However, their biological activity alone may support ecotoxicity assessments of chemicals with high production volumes, especially in view of the increasing importance of freshwater resources and use of drug compounds.

If receiving waters are used for potable supplies, the presence of these compounds (although this is unlikely) may represent a potential hazard to human health, especially in areas without advanced water treatment.

Despite the increasing research activities in this field, there is still a considerable need for future work and further investigation in order to assess the significance of residues in terms of their persistence and potential environmental impact. The development of markers for wastewater contamination of surface waters with pharmaceuticals would also be useful.

A possible recommendation to protect the aquatic and terrestrial environment is that hazard, biodegradability, and fate assessment should be required for all new synthetic chemicals, irrespective of their purpose or end use, in order to determine the potential for them to transfer to wastewater or sewage sludge and the subsequent implications for the environment. Specified criteria regarding toxicity and biodegradation could be set for compounds that exhibit a propensity to enter STWs, and restrictions could be enforced regarding production and use if these criteria were not met Any changes to sewage treatment parameters would need to be offset against the economic costs. Likewise, any restrictions or drug use must be balanced against the potential loss of health benefits derived from the administration of those drugs."

Source: *Critical Reviews in Environmental Science and Technology*

According to the United Nations Environmental Programme Division of Technology, Industry, and Economics Newsletter and Technical Publications Freshwater Management Series No. 1, *"Biosolids Management: An Environmentally Sound Approach for Managing Sewage Treatment Plant Sludge:*

"The presence of contaminants in the sludge or biosolids arising from industrial discharges or pharmaceutical chemicals is a more challenging problem and may be the deciding factor in determining the choice of a utilization disposal option. Put simply, many industries have habitually used the sewer system as a convenient and low-cost way to discharge hazardous wastes. Other chemicals, such as perchlorates from the dissolution of ammonium, potassium, magnesium, or sodium salts, or the unburned byproducts of rocket engine ignition and air bags work into the ground water. Pharmaceutical users similarly dispose of surplus medicines and birth control pills in the same manner, or indirectly pass said pharmaceuticals contained in their waste entering the system. The contaminants accumulate in the biomass and sludge, and can render the material unfit for any beneficial use. The most common options used for disposal of this contaminated material are landfill or incinerations, the cost of which is usually borne by the municipality rather than the hazardous waste generator. Biosolids utilization is a good, environmentally sustainable option when the wastewater is from municipal sources only with limited pharmaceutical concentrations, or when a fully enforced industrial pre-treatment and discharge control system is in place. The decision to select an environmentally sustainable approach to biosolids management can be used very effectively to review and correct point source polluting practices up-stream that should not be taking place.

The final concern is the water content of the product. Primary and secondary wastewater generally contains no more than four percent solids, and the storage and transportation costs of this semi-liquid material limit the application to nearby farmland. Processes to remove water from solids, therefore, are common in biosolids production. The simplest method for removing water is gravity thickening, which involves concentration by simple sedimentation. Allowing sufficient time for solids to settle in tanks can increase suspended solids concentration to five or six percent. Thickening can also include flotation processes, gravity drainage belts, perforated rotating drums, and centrifuges. Nothing is added to biosolids during the gravity thickening processes.

Dewatering is another standard method of water removal in biosolids production. Simple dewatering involves containment of wastewater solids in drying beds or lagoons, where gravity, drainage, and evaporation remove moisture. More often, dewatering involves mechanical equipment such as filter presses, vacuum filters, and centrifuges. Mechanically dewatered solids typically contain between 20% and 45% solids. Finally, drying processes can be used to remove even larger volumes of water from biosolids. Thermal drying with direct or indirect dryers followed by polarization can remove virtually all water and stabilize biosolids to the point of full compliance with any regulatory requirement. This method is used where there is a viable commercial market for the palletized product, and energy costs are not significant.

Thus a particular wastewater treatment facility design is highly dependent upon the wastewater inflows and sludge composition and the discharge and treatment permitting restrictions and plant objectives. Oftentimes these plant designs employ thermophilic and other digestion processes to break down the sludge as part of the separation process. For example, Haase, U.S. Pat. No. 5,906,750, issued May 25, 1999 discloses a method for dewatering of sludge that has been digested by a thermophilic digestion process employing polymers. The polymers are extremely hydrophilic as they agglomerate fine particles for separation from the wastewater in the belt presses. This gelatinous mechanically separated mass is then usually land filled or admixed with other fuels for burning, and may contain significant pathogens and heavy metals. Once deposited and covered, these landfills do not breakdown rapidly. They comprise large deposits of unstable gelatinous soil, which acts as a breading ground for pathogens, contains heavy metals, and pharmaceuticals. If these separated solids are treated with chlorine for pathogen kill, chlorinated carcinogens often result creating a different environmental hazard.

The mechanically separated gray water by-product is usually not treated and is then used for agricultural application, or dumped into a body of water for dilution. If treated with chlorine to kill pathogens before land application or dumping, its usage for agricultural purposes is lost as chlorine acts as an herbicide.

In addition, mechanical sludge separation typically requires a large series of settling ponds with wastewater residence times therein typically from 24 to 48 hours, depending upon the weather and nature of the sludge processed. Typically, landfill and polymer costs comprise approximately 30 percent of the wastewater treatment costs.

As long as a mechanical sewage separation plant operates within its environmental discharge and landfill permit constraints, it provides a low operating and maintenance cost effective sewage disposal method but requires significant upfront capital investment and may result in long term environmental clean-up costs. As urban populations being served grow, and landfill costs increase, these plants seldom meet permitting constraints without significant upgrades in design, particularly with respect to pathogen gray water discharge and the negative impacts caused by mountains of gelatinous solids. In addition, testing methods now identify pharmaceuticals and other chemicals in the wastewater, which were not previously addressed in a treatment plant's design and discharge permits. Plant expansions therefore require new permits, which must address these identified pharmaceuticals and chemical compounds.

Other chemical wastewater treatment methods employ chemical agglomeration and disposal methods, such as Adams et al., U.S. Pat. No. 4,340,489, issued Jul. 20, 1982, wherein wastewater is treated with sufficient sulfurous acid to effectuate solids separation and disinfection, while providing higher quality water. Reynolds et. al, U.S. Pat. No. 4,304,673, issued Dec. 8, 1981 is another wastewater treatment process employing chemicals to continuously disinfect sewage sludge in a similar manner as Adams et al. Rasmussen, U.S. Pat. No. 4,765,911, issued Aug. 23, 1988 is another two-stage chemical treatment process for treating aerobic or anaerobic sewage sludge. These chemical wastewater treatment methods provide disinfected separated solids to form a metal-free fertilizer, which must be disposed of or sold. These chemical treatment methods take less space resulting in lower upfront capital costs, but are more expensive to operate than mechanical separation methods, and require special arrangements with respect to chemical handling and safety. They also require post discharge treatment of the treated wastewater streams to meet environmental and land application requirements.

Wastewater solids disposal land application methods are limited by landfill space, and heavy metal and pathogen contamination. Buhidar, U.S. Pat. No. 5,221,312, issued Jun. 22, 1993 is an example of a chemical wastewater treatment method wherein the chemically treated wastewater heavy metals are removed and pathogens killed before land application.

Where areas for land application are not available, burning or other disposal methods are required. Because of the high water content of mechanically concentrated sludge, only approximately 15% of the separated sewage sludge can be admixed with coal or coke for efficient burning in fluidized beds. To remove the high water content, various heated oil drying processes and mechanical separation methods have been employed. These mechanical densification methods reduce the moisture content, but are capital intensive and generally require significant heat and energy costs. Gasification is an alternative to burning concentrated sludge, but its efficiencies due to the high moisture content of mechanically concentrated sludge are presently not acceptable as the fuel drying costs outweigh the by-product fuel benefits.

Another problem with burning biomass is EPA air emission regulations controlling the mass burning of sludge. One of the more egregious air pollutants emitted from the burning of mechanically concentrated sludge with high sulfur coal or other fuels are dioxides of sulfur (SOx). High sulfur coal of between 2 and 4% by weight sulfur must be scrubbed, or burned with low sulfur coal (under 2% by weight sulfur) or other low sulfur fuels to produce a combined fuel with air emissions under 2% by weight. In addition, $CO_2$ emissions from treatment plant digesters can now be quantified as a point emitter source.

Lastly, pharmaceuticals, perchlorates, chromium VI, and other chemicals must be addressed. The article, Pharmaceuticals, Hormones, and Other Organic Wastewater Contaminants in U.S. Streams, 1999-2000: A National Reconnaissance, Environ. Sci. Technol., 36 (6), 1202-1211, March 2 by Dana W. Kolpin, U.S. Geological Survey, 400 S. Clinton Street, Box 1230, Iowa City, Iowa 52244 Edward T. Furlong U.S. Geological Survey, Box 25046, MS 407, Denver, Colo. 80225-0046; Michael T. Meyer U.S. Geological Survey, 4500 SW 40th Avenue, Ocala, Fla. 34474; E. Michael Thurman U.S. Geological Survey, 4821 Quail Crest Place, Lawrence, Kans. 66049; Steven D. Zaugg U.S. Geological Survey, Box 25046, MS 407, Denver, Colo. 80225-0046; Larry B. Barber U.S. Geological Survey, 3215 Marine Street, Boulder, Colo. 80303; Herbert T. Buxton U.S. Geological Survey, 810 Bear Tavern Road, West Trenton, N.J. 08628 provided the first nationwide reconnaissance of the occurrence of pharmaceuticals, hormones, and other organic wastewater contaminants (OWCs) in water resources. The U.S. Geological Survey used five newly developed analytical methods to measure concentrations of 95 OWCs in water samples from a network of 139 streams across 30 states during 1999 and 2000. The selection of sampling sites was biased toward streams susceptible to contamination (i.e. downstream of intense urbanization and livestock production). OWCs were prevalent during this study, being found in 80% of the streams sampled. The compounds detected represent a wide range of residential, industrial, and agricultural origins and uses with 82 of the 95 OWCs being found during this study. The most frequently detected compounds were coprostanol (fecal steroid), cholesterol (plant and animal steroid), N,N-diethyltoluamide (insect repellant), caffeine (stimulant), triclosan (antimicrobial disinfectant), tri (2-chloroethyl)phosphate (fire retardant), and 4-nonylphenol (nonionic detergent metabolite). Measured concentrations for this study were generally low and rarely exceeded drinking-water guidelines, drinking-water health advisories, or aquatic-life criteria. Many compounds, however, do not have such guidelines established. The detection of multiple OWCs was common for this study, with a median of seven and as many as 38 OWCs being found in a given water sample. Little is known about the potential interactive effects (such as synergistic or antagonistic toxicity) that may occur from complex mixtures of OWCs in the environment. In addition, results of this study demonstrate the importance of obtaining data on metabolites to fully understand not only the fate and transport of OWCs in the hydrologic system but also their ultimate overall effect on human health and the environment.

One way of dealing with these organic compounds is photo catalysis discussed in the article entitled "A review of synergistic effect of photo catalysis and ozonation on wastewater treatment", by AGUSTINA T. E.; ANG H. M.; VAREEK V. K., Journal of photochemistry and photobiology. C, Photochemistry reviews ISSN 1389-5567, the abstract of which states:

"For the treatment of wastewater that contain recalcitrant organic compounds, such as organo-halogens, organic pesticides, surfactants, and colouring matters, wastewater engineers are now required to develop advanced treatment processes. A promising way to perform the mineralization of this type of substance is the application of an advanced oxidation process (AOP). Photocatalytic oxidation and ozonation appear to be the most popular treatment technologies compared with other advanced oxidation processes (AOPs) as shown by the large amount of information available in the literature. The principal mechanism of AOPs function is the generation of highly reactive free radicals. Consequently, combination of two or more AOPs expectedly enhances free radical generation, which eventually leads to higher oxidation rates. The use of combine photo catalysis and ozonation is an attractive route because of the enhancement of the performance for both agents by means of the hydroxyl radical generation, a powerful oxidant agent that can oxidize completely the organic matter present in the aqueous system. The scope of this paper is to review recently published work in the field of integrated photo catalysis and ozonation on wastewater treatment. In this review the chemical effects of various variables on the rate of degradation of different pollutants are discussed. The mechanism and kinetics has also been reported. It can be concluded that photocatalytic oxidation in the presence of ozone is a process that is qualitatively and quantitatively different from the well-known photocatalytic oxidation with oxygen and the ozonation without photocatalyst. The reason for the higher oxidation rate is probably a photocatalytic induced decay of ozone, initiated by the combination of titanium dioxide and UV-A radiation.

These photo catalysis and ozonation chemicals are difficult to incorporate into a conventional wastewater treatment plant, and therefore are usually applied as a tertiary treatment process of the wastewater plant's treated effluent.

Where the point emitter source of these pharmaceuticals is known, they may be removed by solid phase extraction (SPE) using an ion exchange, such as the Oasis HLB extraction cartridge; see "Solid phase extraction and HPLC determination of veterinary pharmaceuticals in wastewater" by Sandra Babic, Danijela Asperger, Dragana Mutavdzic, Alka J. M. Horvat, and Marija Kastelan-Macan; Laboratory of Analytical Chemistry, Faculty of Chemical Engineering and Technology; University of Zagreb published in Volume 70, Issue 4, dated Nov. 15, 2006, pages 732-738 in a collection of papers presented at the first worship of the European Union: Analysis and Removal of Contaminants from Wastewaters for the Implementation of the Water Framework Directive—$1^{st}$ EMCO 2005. As point source emissions are often unknown, this pretreatment method prior to entering a wastewater treatment system is often unfeasible.

Similarly, according to the article "Welcome to Perchlorate News.com, an online newsletter with up-to-the-minute news and information about the treatment of Perchlorate contamination in water:

"Perchlorate ($ClO_4^-$) is an anion that originates as a contaminant in ground water and surface waters from the dissolution of ammonium, potassium, magnesium, or sodium salts. There have been large volumes of perchlorate being disposed of since the 1950's and perchlorate has been detected in at least 14 states, every state having a confirmed perchlorate manufacturer or user. In 2001 the EPA began requirement for monitoring this contaminant in the nation's drinking water and in 2002 the US EPA submitted a proposed reference dose of 1 part-per-billion (ppb) for perchlorate in drinking water based on perceived changes in infant rat brain structure at a dose equivalent to 300 ppb for a 150 pound human adult or as low as 45 ppb for a bottle-fed infant. Regulatory pressures to reduce perchlorate concentrations in surface and ground water have been increasing. The EPA has set a provisional action level for drinking water of 32 µg/L (ppb) and more states have also established provisional levels, including California, Texas, Nevada and Arizona, with those of California and Nevada currently the most stringent, at 18 µg/L (ppb)."

Coppola et al., U.S. Pat. No. 6,077,432 issued Jun. 20, 2000 provides a method for bio-degradation of ammonium perchlorate, nitrate, hydrolysates, and other energetic materials utilizing at least one micro aerobic reactor containing a mixed bacterial culture. This process requires significant residence time in large reactor vessels.

Mower, U.S. Pat. No. 5,382,265 issued Jan. 17, 1995 discloses another perchlorate removal process using a stripping tower to concentrate the perchlorates. Potassium chloride is added to the concentrated perchlorate solution to form potassium perchlorate, which is cooled to effect crystallization of the potassium perchlorate removed by centrifuge or filer press. This process is energy intensive, involving a number of concentration separation steps difficult to control.

Chromium VI is also a problem, particularly in drinking waters. Chromium is a metal found in natural deposits as ores containing other elements. The greatest use of chromium is in metal alloys such as stainless steel; protective coatings on metal; magnetic tapes; and pigments for paints, cement, paper, rubber, composition floor covering and other materials. Its soluble forms are used in wood preservatives.

Thus there remains a need for a method and apparatus, which combines the advantages of both chemical and mechanical water treatment to meet environmental requirements, plant objectives, and community preferences. The hybrid method and apparatus described below provides such an invention.

SUMMARY OF THE INVENTION

The present invention comprises a hybrid chemical/mechanical water treatment method and apparatus water treatment to remove PPCPs, perchlorates, heavy metals, and other chemicals to meet environmental requirements, plant objectives, and community preferences.

Method

The method comprises determining if the water inflows can be chemically dewatered to separate solids from the wastewater stream. Chemical dewatering consists of injecting sulfur dioxide into the water stream and observing if any solids contained therein self agglomerate and begin to separate. These self agglomerated solids do not stick to separating equipment and filters.

Next, a portion of the water stream inflows and/or mechanically concentrated wastewater sludge flows is diverted for chemically dewatering based on at least one of the following factors:

i. treatment costs,
  ii. budget constraints for expansion,
  iii. the present plant capacity to handle future treatment demands,
  iv. eutrophication discharge requirements,
  v. increased environmental treatment discharge requirements,
  vi. changes in the composition of the treatment plant inflows,
  vii. landfill capacity constraints,
  viii. energy heat requirements of any drying beds, ix. community aesthetic preferences, x. time of construction required to construct facilities to meet additional treatment capacity required, xi. treated water quality required for sale or discharge, xii. concentrated sludge water content required for disposal, xiii. odor, heavy metal and pathogen process requirements, xiv. chemical treatment wastewater water/solids separation times, xv. evaporation losses xvi. treatment plant $CO_2$ emissions reductions required;

xv. pharmaceuticals, hormones, and other organic wastewater contaminants (OWCs) present in the wastewater, xvi. Perchlorates and chlorates present in the wastewater.

The diverted portion of the water inflows and/or wastewater sludge slurry flows is then chemically treated to separate the solids from the water. The chemically separated solids are then collected and disposed of preferably utilizing existing water or sewage plant disposal processes and/or in accordance with sewage treatment plant disposal discharge requirements. The chemically treated water is then treated and disposed of consistent with the water or sewage treatment plant discharge permits and/or re-injecting it into a segment of an existing sewage treatment plant treatment processes such that any conventional aerobic and anaerobic digesters are bypassed to prevent the killing of helpful bacteria within the digesters.

The above costs and benefits include any savings from economies of scale resulting from expanded usage of underutilized segments of the existing water treatment or wastewater treatment facility. These optimal utilization costs offset the chemical treatment costs to determine the net costs of expanding the existing sewage treatment plant using both chemical and mechanical technologies. Thus, the benefits of both technologies are employed and construction and land costs minimized, while maintaining any of the existing facility's back-up reserve capacity.

The preferred chemicals for chemical dewatering are anhydrous or hydrous sulfur dioxide or any similar reacting chemicals, which provide rapid water/solids separation. Sulfur dioxide dissolves readily in water requiring little mixing. Chemical separation of wastewater and dewatering of the resultant solids typically takes 20 minutes to an hour compared to 24 and 48 hours with mechanical separation. The size of the treatment tanks is therefore materially less so land usage is minimized. Chemically treated wastewater methods provide greater flexibility in equipment separation designs, which result in further cost savings. Nor is there any need for adding polymers to agglomerate first the solids as is the case with conventional belt presses and centrifugal or mechanical separators used in conventional mechanical sewage treatment plants, providing additional cost savings.

Material handling costs are also reduced. Sulfur dioxide treatment generates initial separated solids having a water content of 30% to 40%. If the chemical exposure is extended to insure disinfection, odor generation during the remainder of the treatment and disposal process is minimized as discussed in more detail below. Sulfur dioxide also acid leaches the heavy metals into the liquid fraction for ease of removal via the subsequent addition of lime or other reagents.

Sulfur dioxide chemical dewatering also generates self-agglomerating solids, which can be more readily separated from the liquid fraction via conventional screens or drying beds.

This rapid chemical injection and separation generating self-agglomerating solids and heavy metals in the liquid fraction enables the use of much smaller gas injection and separation equipment than conventional mechanical dewatering systems. The chemical dewatering equipment can be installed in modules, as needed. Thus, chemical dewatering requires lower capital equipment investment, with comparable or somewhat higher handling costs. When combined with the higher capital equipment investment and lower handling costs of a conventional plant provides, it generates an overall blended wastewater treatment cost, which is comparable to or lower than conventional mechanical separation treatment costs alone.

Anhydrous and hydrous sulfur dioxides are strong disinfectants. When employed, they disinfect the liquids and solids to provide solids storage without the emissions of odors. Sulfur dioxide is relatively cheap and readily available. It may also be generated on-site from the burning of raw sulfur; particularly if additional heat from sulfur burning is required for solids process drying. It is extremely hydrophilic and forms sulfurous acid on contact with water. Injection until an elevated pH of approximately 2 for approximately 30 minutes results in complete disinfection; see Adams et al., U.S. Pat. No. 4,340,489.

After the initial solids separation, the sulfur dioxide treated solids have a moisture content of 30% to 40% and continue to shed water for approximately 24 hours, ultimately reaching the consistency and dryness of wood with a less than 10 percent by weight water content. This dried product may then be land filled, burned, or gasified in a manner consistent with the treatment plant unit processes and/or permit constraints.

The hybrid chemical/mechanical water treatment method and apparatus is expanded as needed and thus avoids the mechanically concentrated carrying costs of constructed excess capacity to meet projected future needs.

For example, the typical operating and maintenance costs and investment costs of a conventional mechanically dewatered sewage treatment plant for the type of plant shown in FIG. 1 has a cost of $26.3 million, a $139,000/year annual maintenance cost, and an annual operating cost of $419,000/year. This 10 MGD plant expansion, if operated at full capacity provides low $/MGD operating costs resulting from large volume wastewater treatment economies of scale. Unfortunately, often the anticipated expansion volume for a given plant is only 0.5 to 1 MGD per year, taking years to build up sufficient treatment volume to provide optimal treatment costs based on economies of scale. The excess carrying capacity for 20 years under this scenario results in very high upfront overall treatment costs, when the cost of installation is factored in.

In addition, it takes three years to construct this type of conventional facility so that construction must start before the actual additional capacity is required, causing additional carrying costs.

Applicant's hybrid method provides a combination mechanical/chemical dewatering wastewater treatment solution to provide incremental wastewater treatment as needed. Chemical dewatering equipment has a much lower installation cost, which can be leased or installed on a pay as you go basis. For example, instead of the $26,500,000 price for a 10 MGD conventional plant, a $2,000,000 modular unit may be added to the existing footprint to provide a 0.5 to 1 MGD hybrid chemical dewatering system as needed to the existing plant. Additional 0.5 to 1 MGD modules may then be installed as needed. The concentrated solids are then disposed of in accordance with the plant's existing processing units and permitting requirements—for example, for those plants land filling treated solids, such as the Central Valley Water Reclamation Facility in Salt Lake City, Utah, landfill is used for disposal. For this facility, the water content of its mechanically generated solids is typically 40% by weight. Employing chemical dewatering results in a 4% by weight composition to provide a net 36% by weight savings. With chemical dewatering its present typical disposal costs of approximately $32.00/ton would be similarly reduced 36%. In addition, the reduced volume of treated solids extends the life of the present landfill facility. Other savings from chemical dewatering result from avoiding the costs polymers employed in more expensive conventional treatment plants, which typically average 9 pounds per ton of processed sludge as well as the reduced use of its belt presses. Off-setting these cost savings are the added costs of sulfur dioxide. The amount of $SO_2$ is dependent upon the alkalinity of the wastewater, which generally is no more than 800 mg/liter (Standard Methods, $14^{th}$ Ed. APHA, 1975); see Reynolds, U.S. Pat. No. 4,304,673. Reynolds found that generally no more than 2000, and preferably no more than about 600 mg of $SO_2$ per liter of wastewater was required. Using 1 liter equals 0.2641721 gallons and 1 mg=1/1000 gr., 1 gr.=2.204623×10−3 pounds; for a 0.5 MGD plant this equals:

0.5×1,000,000 gallons/day×1 liter/0.2641721 gallons× 2000 mg/liter×1 gr/1000 mg×0.26417212 gallons/liter× $2.204623 \times 10^{-3}$ pounds/gram=2,204.6229 pounds/day or approximately 1 ton of sulfur dioxide. Current sulfur dioxide pricing in dollars per ton of liquid bulk f.o.b. works currently is around $230/ton so that chemical cost is relatively nominal. This sulfur dioxide may be delivered to the site in tanks, or generated on site via sulfur burners. Sulfur burners are relatively efficient and have the additional benefit of generating considerable heat from sulfur burning, which can be used to supply heat to the treatment plants drying beds.

In areas where eutrophication is a problem, the heavy metals can be removed from the treated wastewater stream via the addition of CaO or hydrated lime before discharge. This not only precipitates heavy metals as metal hydroxides, but some insoluble calcium phosphates, which are then removed via filters or belt presses and sold or land filled. The demetalized, low phosphate treated water is then mixed with the plant's treated water discharge stream to dilute the same for sale or land application. If eutrophication is not a problem, the acidified sulfurous acid wastewater can be added to the wastewater plant discharge to remove chlorine before finally releasing the treated wastewater, thus saving the cost of adding further sulfur dioxide for dechlorinization.

The hybrid chemical/mechanical dewatering sewage treatment method is thus employed in a manner consistent with the conventional treatment plant. Where solids are land filled, the chemically separated solids are land filled. If the existing treatment plant burns or gasifies separated solids, the chemically separated solids are similarly burned or gasified.

The hybrid chemical/mechanical dewatering sewage treatment method preferably is operated to optimize the operations of an existing treatment plant to avoid stranded costs. Removal of the heavy metals from the chemically treated water via alkalization precipitation to precipitate heavy metals and phosphates for removal is therefore employed by adding the metal and phosphate reduced chemically treated water to the mechanically separated wastewater stream for dilution to comply with plant discharge requirements or sale. If the conventional wastewater treatment plant removes heavy metals via electrolysis, the chemically treated water is preferably similarly treated to precipitate heavy metals contained therein for removal, and the demetalized chemically treated water then added to the mechanically separated wastewater stream to dilute its heavy metal content. This optimization approach eliminates the need to modify the plants various discharge and treatment permits.

A particularly troubling chromium compound found in potable waters is Chromium VI, which is a strong oxidizing agent and carcinogen. According to Wikipedia, in 2010, the Environmental Working Group studied the drinking water in 35 American cities. The study was the first nationwide analysis measuring the presence of the chemical in U.S. water systems. The study found measurable hexavalent chromium in the tap water of 31 of the cities sampled, with Norman, Okla., at the top of list; 25 cities had levels that exceeded California's proposed limit. Note: Concentrations of Cr VI in US municipal drinking water supplies reported by EWG are within likely, natural background levels for the areas tested and not necessarily indicative of industrial pollution (CalEPA Fact Sheet), as asserted by EWG. This factor was not taken into consideration in their report.

Chromium(VI) is most commonly encountered in the chromate ($CrO_2^{-4}$) and dichromate ($Cr_2O_2^{-7}$) anions. Chromate is produced industrially by the oxidative roasting of chromite ore with calcium or sodium carbonate. The chromate and dichromate anions are in equilibrium:

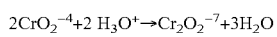

$$2CrO_2^{-4} + 2 H_3O^+ \rightarrow Cr_2O_2^{-7} + 3H_2O$$

Both the chromate and dichromate anions are strong oxidizing reagents at low pH.

Where Chromium VI is present, the following treatment methods have been approved by EPA for removing chromium: Coagulation/Filtration, Ion Exchange, Reverse Osmosis, Lime Softening. The present method uses $SO_2$ and sulfites in acid as a reducing agent to reduce Chromium VI into Chromium III or Chromium IV before lime precipitation for removal so that the landfilling of collected filtrate will not leach hazardous Chromium VI back into the groundwater as is the case with conventional precipitation methods. Addition of sulfurous acid thus provides a sulfite reducing agent in an acidic environment, which reduces Chromium VI to the less harmful Chromium II or Chromium III species.

Applying the present method to a conventional water treatment plant with few solids, the hybrid chemical/mechanical water treatment method adds sulfurous acid to reduce the water pH adjusted to reduce the valance state of the heavy metals contained therein for subsequent precipitation removal with lime or alkaline chemicals to precipitate as metal hydroxides for filtration removal, and the demetalized chemically treated water is then pH adjusted for sale and reuse.

In addition, the sulfurous acid reduces perchlorates contained in potable water systems so that they are not a hazard. Perchlorates are strong oxidizing agents readily reduced by organic material, but as potable water has little organic material for reduction, there is need for similar sulfurous acid sulfite reduction as used for Chromium VI reduction.

For wastewater treatment, most wastewater treatment plants have dominant siting and permit constraints, which dictate the amount of chemical dewatering required. If this is not the case because of numerous competing siting and permitting constraints and factors, the hybrid chemical/mechanical water treatment method often employs a computer and software to determine the optimal portion of wastewater to be diverted for chemical dewatering. This is determined by assembling and inputting into a computer a database consisting of:

i. the present conventional wastewater treatment plant processing capabilities, its quantity and quality of discharge process water, sludge production, pathogen content, and landfill requirements, ii. the operating costs of mechanically concentrating and dewatering sludge, iii. the permitting constraints of disposing of sludge, wastewater discharge, and remediation requirements, iv. siting constraints on expanding an existing facility, and wastewater inflow concentrations and content.

A comparable database of the chemical concentration and dewatering costs to meet the expansion needs of the plant to meet current permitting objectives, the added revenues from sales of treated water, the avoidance of landfill costs and other benefits associated with chemical concentration and dewatering costs is then assembled and inputted into the computer along with a program projecting the net costs to meet the expansion needs using chemically dewatering methods. A calculation program is then inputted into the computer projecting the net costs of expanding the existing sewage treatment plant using similar existing mechanical methods, and off-setting revenues vs. the net costs of expanding the existing sewage treatment plant using existing mechanical technology in combination with the net costs of chemical concentration and dewatering costs to provide for the expansion need. Based on the net cost comparisons, a combined system employing both mechanical and chemical concentration and dewatering technology is selected and designed to provide a blended wastewater treatment system for this expansion need within permitting constraints.

Generally the hybrid chemical/mechanical water treatment method databases also include:

i. the BTU content of sludge mechanically concentrated at the proposed site, its water content, and concentration, handling, environmental compliance, and disposal costs, ii. the BTU content of sludge chemically dewatered at the proposed site, its water content, and concentration, handling, environmental compliance, and disposal costs, iii. the cost per BTU to generate fuel gas from mechanically concentrated sludge, iv. the cost per BTU to generate fuel gas from chemically dewatered sludge, v. gas delivery and clean-up costs, and vi. the environmental operating restrictions and requirements to operate a gasifier processing sludge mechanically concentrated versus chemically concentrated.

The computer program then selects the most cost effective percentages of chemical and mechanical separated sludge for gas production within permitting and siting requirements.

In addition, this hybrid chemical/mechanical water treatment method database for gasification generally includes any off-setting revenues from chemically dewatered sludge water sales and mechanically concentrated sludge water sales before selecting the most cost effective sludge concentration and gas production method. Also added to the databases are any standby backup charges for retaining a portion of the existing sewage treatment plant in reserve before selecting the most cost effective sludge concentration and gas production method.

The hybrid chemical/mechanical water treatment method databases may also include any off-setting soil conditioning benefits associated with chemical dewatering of sewage before selecting the most cost effective sludge concentration and gas production method. This is particularly important in alkaline soil regions where the additions of acids to soils is routinely required, thus providing an additional revenue stream to be factored in against the plant costs. This water conditioning removes chlorine as a side benefit; thereby further aiding in plant growth.

Probably the most critical factor in employing the hybrid chemical/mechanical water treatment method is adding to the database community preference values in terms of weighted benefits or costs reflecting the environmental benefits derived from chemical odor suppression, removal of heavy metals, pathogen kill, and a reduced footprint plant size. This subjective factor may be quantified and reflected in zoning or permitting constraints compliance costs assigned to govern the present mechanical sewage treatment plant. These community values change over time as suburbs expand around a sewage treatment plant. Open lagoons, once acceptable, have become a severe property devaluation factor as large homes surround the sewage ponds. In addition, these sewage ponds attract birds and other insects, which can spread disease or interfere with incoming flights near airports. Hence a community may place a premium on smaller sewage treatment expansion units, thereby adding weighting factors to the databases dictating the selection of chemical dewatering systems, which only require 20 to 30 minute dwell time as opposed to 24 to 48 hours settling ponds. This reduces the reaction vessel sizing by a factor of 50 to 100 times resulting in a smaller expansion footprint.

PPCPs, perchlorates, and chromium VI are removed or reduced by the present method via sorption onto the filtered acidified solids, oxidation/reduction via air/$SO_2$/sulfite reduction, acidification/alkalinization via sulfurous acid/lime precipitation removal, and if necessary, the addition of stronger oxidizing agents. Iron II may also be added if an additional reducing agent is required. Where both oxidation and reduction are required, a Fenton reagent combining peroxide in the presence of iron II may be employed.

The clear filtered chemically treated water may then be exposed to ultraviolet light to inactivate those chemicals reduced by photo-degradation, if necessary.

Apparatus

The apparatus for hybrid chemical/mechanical water treatment generally comprises a conventional water treatment plant having dewatering means to mechanically separate solids from water inflows. Means for diverting for chemical dewatering a portion of conventional water inflows, such as a stream splitter, are then incorporated. The stream splitter is preferably adjustable to divert differing portions of wastewater inflows. The stream splitter diverts a portion of conventional mechanically dewatered wastewater inflow streams and/or mechanically dewatered solids for chemical dewatering, from greater than 0% and up to 100% based on at least one of the following factors:

i. treatment costs, ii. budget and site constraints for expansion, iii. the present plant capacity to handle future treatment demands, iv. eutrophication discharge requirements, v. increased environmental treatment discharge requirements, vi. changes in the composition of the treatment plant inflows, vii. landfill capacity constraints, viii. energy process heat requirements, ix. community aesthetic preferences, x. time of construction required to construct facilities to meet additional treatment capacity required, xi. treated water quality required for sale or discharge, xii. concentrated sludge water content required for disposal, xiii. odor, heavy metal and pathogen process requirements, xiv. chemical treatment wastewater water/solids separation times, xv. evaporation losses, xvi. treatment plant $CO_2$ emissions reductions required;

xv. pharmaceuticals, hormones, and other organic wastewater contaminants (OWCs) present in the wastewater, xvi. perchlorates and chlorates and other inorganic chemical species present in the wastewater.

The stream splitter is associated with means for chemically treating the diverted portion of the water inflows to separate the solids from the water, such as an $SO_2$ gas injection system (a sulfonator) holding the chemically treated wastewater into a reaction zone until the desired water/solids separation occurs. Means for separating and disposing of the chemically separated solids, such as screens or drying beds are then employed to remove the solids for land filling or drying the same for use as a fuel or gasification. The chemically separated solids may be admixed with mechanically separated solids in a ratio, which provides a combined fuel with reduced overall moisture content than that of the mechanically separated solids. Generally, the means to convert the chemically separated solids into fuel are the on-site existing conventional mechanically dewatered gasification equipment and electrical generation equipment. However, smaller mobile equipment may be employed to only address the solids generated by the chemically dewatered system where this gasification and electrical generation equipment is not available.

Where heavy metals must be removed from the water, means to pH adjust the chemically treated water to precipitate heavy metals contained therein is included for removal. This usually is a liming chamber where lime or hydrated lime is added to precipitate metal hydroxides and calcium phosphates for removal via mechanical separators, such as belt presses. However, other means to separate heavy metals precipitate from the demetalized chemically treated water for disposal may be included such as adding ferric chloride to precipitate the metals. This leaves metal free chemically treated water, which is combined with the mechanically separated water streams to provide a blended diluted composition so their heavy metals content will not cause eutrophication if discharged into a stream or open water.

Means for disposing of the chemically treated water, such as water reinjection or blending apparatus of the chemically treated water with conventional mechanically dewatered wastewater discharge may be included. The demetalized chemically treated water is generally added to the mechanically separated wastewater stream to dilute its heavy metal content before discharge where the percentage concentration of the plant discharge must be improved. Alternatively, the pH adjusted chemically treated water with the heavy metals removed may be sold for reuse. The separated heavy metal hydroxide precipitate may then be sold for reuse.

The means for diverting for chemical dewatering a portion of conventional water inflow stream and/or mechanically dewatered solids is adjustable periodically to adjust the proportion of inflow stream for chemically dewatering to meet changing plant operating factors.

The hybrid chemical/mechanical water treatment equipment also inactivates and removes pharmaceuticals and other contaminants in wastewater inflow streams and/or conventional wastewater treatment plant process liquid streams. This is accomplished by diverting and oxidizing a portion of the water inflow streams and/or conventional process liquid streams, if they have not been previously oxygenated, to oxidize those chemical species, which are inactivated by oxidation. The diverted portion may be of the entire intake or process flow or a lesser amount (greater than 0% and up to 100%).

If air is not sufficient to oxidize pharmaceuticals and personal care products (PPCPs), hydrogen peroxide, $Fe^{+2}$, or a combination of the two (a Fenton reagent) may be added for oxidizing and reducing PPCPs.

After oxidation, into the diverted portion is injected $SO_2$ at a pH that generates sufficient sulfurous acid with free $SO_2$ to condition solids and wastewater for disinfection separation, and to deodorize the separated wastewater inflows, and suppress $CO_2$ emissions and destroy those chemical species, which are inactivated by sulfurous acid reduction. This is preferably accomplished by running the water through a sulfurous acid generator to deliver sulfur dioxide as needed.

The sulfur dioxide treated wastewater is then held in the same vessel into which the sulfur dioxide was injected, or a separate detention vessel, at a pH between approximately 1.5 and 4.5, depending upon dwell time, until at least one of the following occur:

i. a conditioned water is produced where suspended solids agglomerate and dewater by shedding water upon separation and drying, ii. dissolved solids and ammonia are sulfurous acid treated resulting in odor reduction, iii. $CO_2$ microbial production ceases, iv. required disinfection occurs to meet disinfection discharge permit limits, v. perchlorate, chlorate, chromium VI, and other chemical species present in the water, which have not previously been inactivated by contact with carbon in the solids, are inactivated by sulfurous acid reduction.

The destruction of odor causing microbes feeding on the water stops further $CO_2$ production, and may be employed where the wastewater treatment plant is mandated to reduce these carbon dioxide emissions. Also, if there is significant carbon in the suspended solids, most perchlorates and chlorates will have been reduced on contact with the solids. The separation and disposal of the solids also removes most of the adsorbed microbes. Under this wastewater treatment scenario, the sulfur dioxide reduction treatment is more for acidification, inactivating of certain chemicals such as Chromium VI susceptible to acid reduction, adding sulfurous and sulfate ions, and chemical dewatering of the solids. For example, tests at the Saticoy-Jose Florez Wastewater Treatment Plant at Saticoy, Calif. indicated that the treated effluent undergoing sulfur dioxide treatment had fecal coliforms <2 MPN. This disinfection level is suitable in California for gray water land application. Consequently, the sulfur dioxide was used primarily to acid reduce pharmaceuticals, and condition the solids and separated wastewater for land application.

Any solids are then mechanically separated and disposed of from the chemically treated water inflow streams and/or conventional process liquid streams from its liquid fraction in accordance with a water treatment plant's disposal permit requirements. Preferably, these separated solids are burned or gasified, if there are significant pharmaceuticals adsorbed thereon.

The pH of the chemically treated liquid fraction is then raised sufficiently to inactivate chemicals that are inactivated by a pH in excess of 8. This also precipitates metal hydroxides for subsequent filtration removal.

The pH of the chemically treated liquid fraction for discharge is then lowered to that required by the water treatment plant's discharge permit requirements.

The chemically treated liquid fraction may be tested to identify any remaining pharmaceuticals and chemical contaminants remaining in the chemically treated liquid fraction. If found, appropriate reducing and oxidizing agents are then added to inactive them. These added reducing and oxidizing agents are then removed by repeating the above method steps. One preferred oxidizing agent is hydrogen peroxide, which may be added to the chemically treated liquid fraction in a manner to inactivate any remaining chemicals, which require added oxidation for inactivation.

A preferred reducing agent is ferrous chloride, which provides a ferrous ion solution is added to the chemically treated liquid fraction to inactivate any remaining chemicals, which require added reduction for inactivation. As these added oxidizing and reducing agents are extremely powerful and result in additional inactivation products, the concentrations of any remaining pharmaceutical and chemical species must justify the additional treatment.

Advantages

Pharmaceuticals and Chemical Removal

The treatment plant and method discussed above employing rapid sludge chemical dewatering technology in conjunction with slower conventional mechanical dewatering solids agglomeration and disposal methods inactivates and removes pharmaceuticals and other contaminants entering sewage treatment plants via oxidation reduction, acidification and alkalization before final pH adjustment to meet environmental permitting restrictions and siting limitations for disposal of sewage and wastewater.

Water Savings

Besides the blended cost and expedited installation advantages discussed above, another advantage of the hybrid chemical/mechanical water treatment apparatus for waters is its reduced process water loss. Chemically dewatered sludge processes are much faster than conventional mechanical dewatering systems so evaporation losses are reduced. Conventional mechanical concentration wastewater systems are most successful in areas where the excess wastewater is evaporated into the atmosphere in hotter more arid regions. Unfortunately, this evaporative consumptive use of water in arid regions is now becoming a conservation issue. Presently on the Jordan River system in Salt Lake City, Utah, various sewage treatment plants are seeking to claim water rights to the treated waters exiting their plants and divert and sell the same to different water drainages to off-set costs. These water right claims for the first time in Utah will indirectly establish the cost of evaporative consumptive use of water related to sewage treatment operations so that evaporated lost water now becomes a cost of operations. Not only is water lost through evaporation, but the high water content in conventional land filled sewage must also be factored. Hence, future mechanical concentration wastewater treatment systems must factor in the lost process water consumption as a cost in evaluating the best sewage treatment mode as the volume entering the plant and leaving the plant is easily quantifiable and affects future water right claims.

Additional off-setting revenues from higher quality chemically dewatered sludge and water sales also result from this hybrid treatment. The additional water generated often provides sufficient extra water for surplus water sales while still maintaining the minimal flows to satisfy the water rights claims of downriver users and habitat enhancements. This avoids water treatment operating dictates from downriver users who have vested rights.

Eutrophication

Other environmental clean-up advantages may be factored in employing a hybrid chemical/mechanical water treatment system, such as addressing eutrophication impacts of algae bloom. Present mechanical concentration methods have focused on banning phosphate detergent usage, and removing phosphates from farm, and industrial sources entering wastewater streams before discharge to prevent eutrophication. These phosphate removal costs are significant, and fail to factor in the eutrophication impacts of heavy metals. *The Swedish Phosphate Report* concluded that removal from phosphates from detergents was pointless and ill advised. Water pollution was a far more complex problem than early environmental activists had assumed and it was proven to depend on a variety of factors, among which phosphate was perhaps one of the least important. The main cause was demonstrated to be industrial pollution by heavy metals, oils and insecticides, as all these substances kill the zooplankton that feed on the algae causing the problem; see *The 13$^{th}$ Element*, by John Emsley, John Wiley & Sons, 2000, at page 273., Chapter "Oh Shit ". The removal of heavy metals and some phosphates by the hybrid chemical, mechanical dewatering system thus results in significant environmental benefits.

Synergy Efficiencies

Combining the chemical concentration and dewatering processes meeting the expansion needs of a conventional mechanical water treatment plant often exceeds compliance with current permitting discharge requirements. A removal of heavy metals and phosphates, sales of tertiary water, reduced landfill costs and other benefits associated with chemical concentration and dewatering not only provide cost savings, but better the overall sewage treatment plant off-site environmental impacts. For example, treating a portion of a wastewater input stream with sulfur dioxide, acid leaches heavy metals from the human sludge into the treated wastewater. These are then readily removed by increasing the pH to separate the metal hydroxides as a cake for landfill; see "Phosphorous: from urine to fire", by Peter E. Childs; http://www.ul.ie/~CinA/Issue 63/TOC27_Phosphorous.htm where approximately 24% of the phosphate in water in Europe is derived from human sewage. Combining chemically treated polished water with the mechanically dewatered sludge wastewater discharge results in an improved plant wastewater discharge. Similarly, the drier solids take less volume when disposed of in the existing mechanical dewatered treatment plant extending the life of the existing landfill.

Fuel

Most mechanical dewatering methods generally produce sludges with high water content as outlined above. Low percentages of this high water content sludge are then admixed with conventional fuels, such as coal, for burning or gasification because of the high water content. Alternatively, they must first be further dewatered via drying beds and dryers, which add to the processing costs. Generally, it has been found that these mechanical dewatered sludge seldom have enough independent fuel value or usage on-site by smaller facilities and must be disposed of using other methods, such as land filling or admixing with other fuels for burning.

Conversely, chemically dewatered sludge is produced by injecting either gaseous $SO_2$ or aqueous $SO_2$ (sulfurous acid) to provide self adhering solids, which shed water to produce a dried solid with low water content and a relatively high BTU low sulfur concentrated fuel suitable for burning or gasification to produce heat, electricity, or other forms of useful energy, such as steam. The term "chemically dewatered" thus refers to an $SO_2$ treated sludge, which forms agglomerated solids, which self adhere and shed water to drain significantly more than conventional sludges to produce a dry solid of the approximate consistency of wood. When used as a fuel, it has a fairly consistent BTU content dependent upon the raw product composition. For example, one chemically treated and separated sludge generated near Logan, Utah produced a chemically dewatered densified fuel having BTU content similar to wood of between approximately 7,040 BTU/lb. ASTM (American Society Testing Method) 02382 and 7,290

BTU/lb. ASTM 02382. The BTU analysis of chemically dewatered densified fuel taken from the Montalvo Municipal Improvement District in Ventura, Calif. tested at 6091 BTU/lb., dry weight. The total moisture content of this chemically dewatered Montalvo sludge was 7.3% by wt. %, which is significantly less that the typical polymer separated sludges of between 40% to 80% by wt. % moisture—resulting in an almost 30 to 70% by weight haulage disposal savings.

Initial separation takes place in one half hour after injection of gaseous $SO_2$ with a 30% to 40% moisture content, which continued to dry over a 24 hour period to moisture content of between 4% and 6%. This chemically treated sludge had the appearance, and texture similar to dark dry wood, and was essentially odorless with a moisture content of between 4% and 6%, and a high cellulose solids content of between 94% and 96% similar to wood making them readily transportable and storable until burned or gasified. This dry wood like sludge had approximately 1.8% by weight $SO_2$ emissions, when burned, which is comparable to those produced by low sulfur coal. Depending upon the fat content of the solids in the wastewater, the treated solids may have even a higher BTU content than wood. Consequently, the by-product fuel of chemically concentrated sludge may be burned directly, and/or admixed with the mechanically separated sludge for burning or gasification.

Soil Conditioning

In arid regions where alkaline soils are often found, the hybrid chemical and mechanical dewatering method for optimizing water treatment plants may generate acidified waters discharge to provide soil conditioning benefits, which reduce nutrient and water agricultural demands by making the soil more porous. In addition, instead of removing nutrients via competing membrane technologies, a balance chemical composition is generated with this hybrid chemical/mechanical water treatment method, thus providing, an revenue source for this land conditioning method.

Community Preferences

Intangible aesthetic factors often drive the selection of water treatment technology in those areas abutting urban development. The hybrid method for optimizing water treatment plants therefore may include adding to the database community preference values in terms of added benefits or costs for the environmental benefits derived from chemical odor suppression, removal of heavy metals, pathogen kill, and reduced site size as opposed to mechanical sludge concentration before selecting the most cost effective sludge concentration and gas production method. Although these aesthetic factors are often subjective, they are often the controlling force for community permitting compliance. As they also vary over time, chemical dewatering of a greater portion of the wastewater influent may be required.

Permitting

Employment of chemical dewatering techniques in an existing conventional mechanical water treatment plants avoids the necessity of seeking zoning changes, and a number of water treatment and discharge permits. Construction is thus expedited, and the overall plant efficiencies improved within existing grand fathered discharge and treatment requirements. Where required, existing permitting constraints can often be bettered via the removal of heavy metals, pharmaceuticals, and reduction in size of the expanded plant footprint to meet additional incoming wastewater loads. The hybrid chemical/mechanical water treatment method for conventional mechanically dewatered treatment plants thus provides a plant, which meets or exceeds permit constraints.

Summary

The hybrid method for optimizing water treatment plants thus employs chemical and mechanical separation and treatment techniques in combination to comply with community environmental permitting and budgetary constraints in a manner heretofore unavailable.

DESCRIPTION OF THE ILLUSTRATED EMBODIMENTS

Applying the above method to wastewater, the design of a wastewater sewage treatment plant is largely a result of the composition of the influent wastewater to be treated and the permitting constraints regarding the treated effluent. Cost factors are significant, but other local requirements often dictate the ultimate plan design.

Cost

The following example illustrates the hybrid chemical/mechanical dewatering plant is cost competitive. There is a marked similarity of wastewater overall composition. Various models have been designed to aid in the preliminary design and cost estimating for wastewater treatment plant construction projects. CapdetWorks produced by Hydromantis, Inc., consulting engineers of Ontario, Canada is one such model. It is an update of the CAPDET model developed by the U.S. Army Corps or Engineers for the U.S. EPA to facilitate the evaluation of wastewater treatment alternatives based on life cycle costs and the degree of treatment provided.

Figure 1:
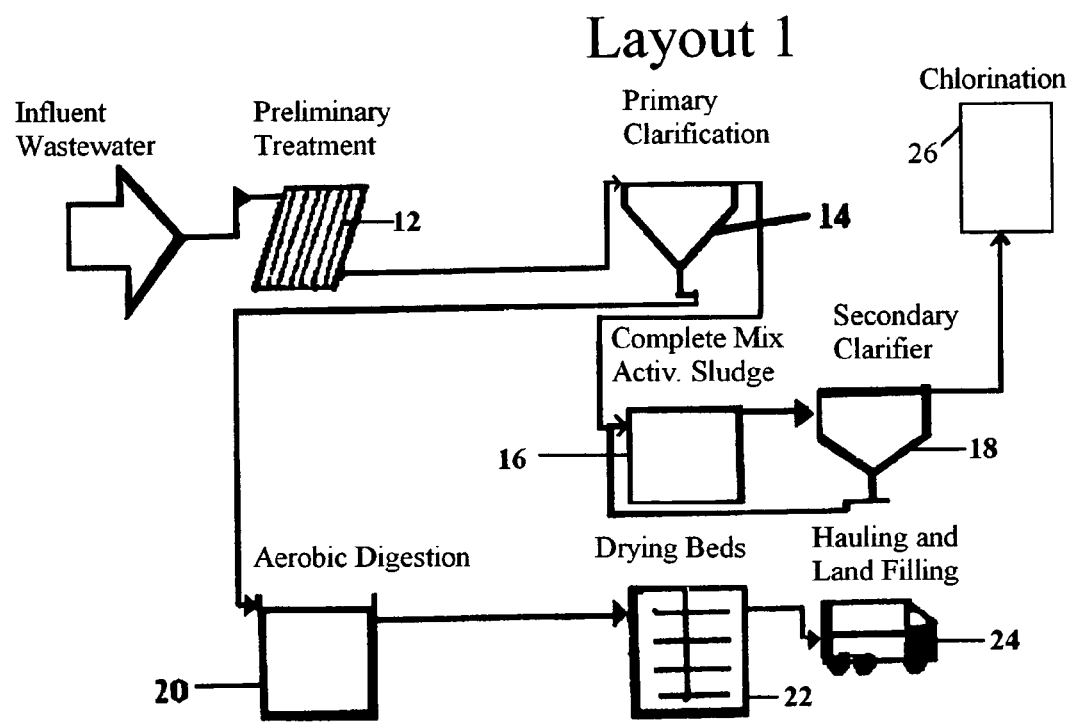
FIG. 1 illustrates a conventional mechanical sludge concentration wastewater treatment plant.

FIG. 1 illustrates a conventional mechanical sludge concentration wastewater treatment plant 10 produced by CapdetWorks. The example cited assumes a medium composition of untreated influent wastewater as follows:

|  | Influent | Effluent | Units |
| --- | --- | --- | --- |
| Max Flow | 10 | 10 | MGD |
| Min Flow | 10 | 10 | MGD |
| Suspended Solids | 220 | 220 | mg/l |
| % volatile solids | 75% | 75% | % |
| BOD | 220 | 220 | mg/l |
| Soluble BOD | 80 | 80 | mg/l |
| COD | 500 | 500 | mg/l |
| Soluble COD | 300 | 300 | mg/l |
| TKN | 40 | 40 | mgN/l |
| Soluble TKN | 28 | 28 | mgN/l |
| Ammonia | 25 | 25 | mgN/l |
| Nitrite | 0 | 0 | mgN/l |

-continued

|  | Influent | Effluent | Units |
| --- | --- | --- | --- |
| Nitrate | 0 | 0 | mgN/l |
| Total Phosphorous | 8 | 8 | mgP/l |
| pH | 7.6 | 7.6 |  |
| Cat ions | 160 | 160 | mg/l |
| Anions | 160 | 160 | mg/l |
| Settleable Solids | 10 | 10 | mL/L |
| Oil & grease | 100 | 100 | mL/L |
| Summer Temp. | 23 | 23 | deg. C |
| Winter Temp | 10 | 10 | deg. C |

Figure 2:
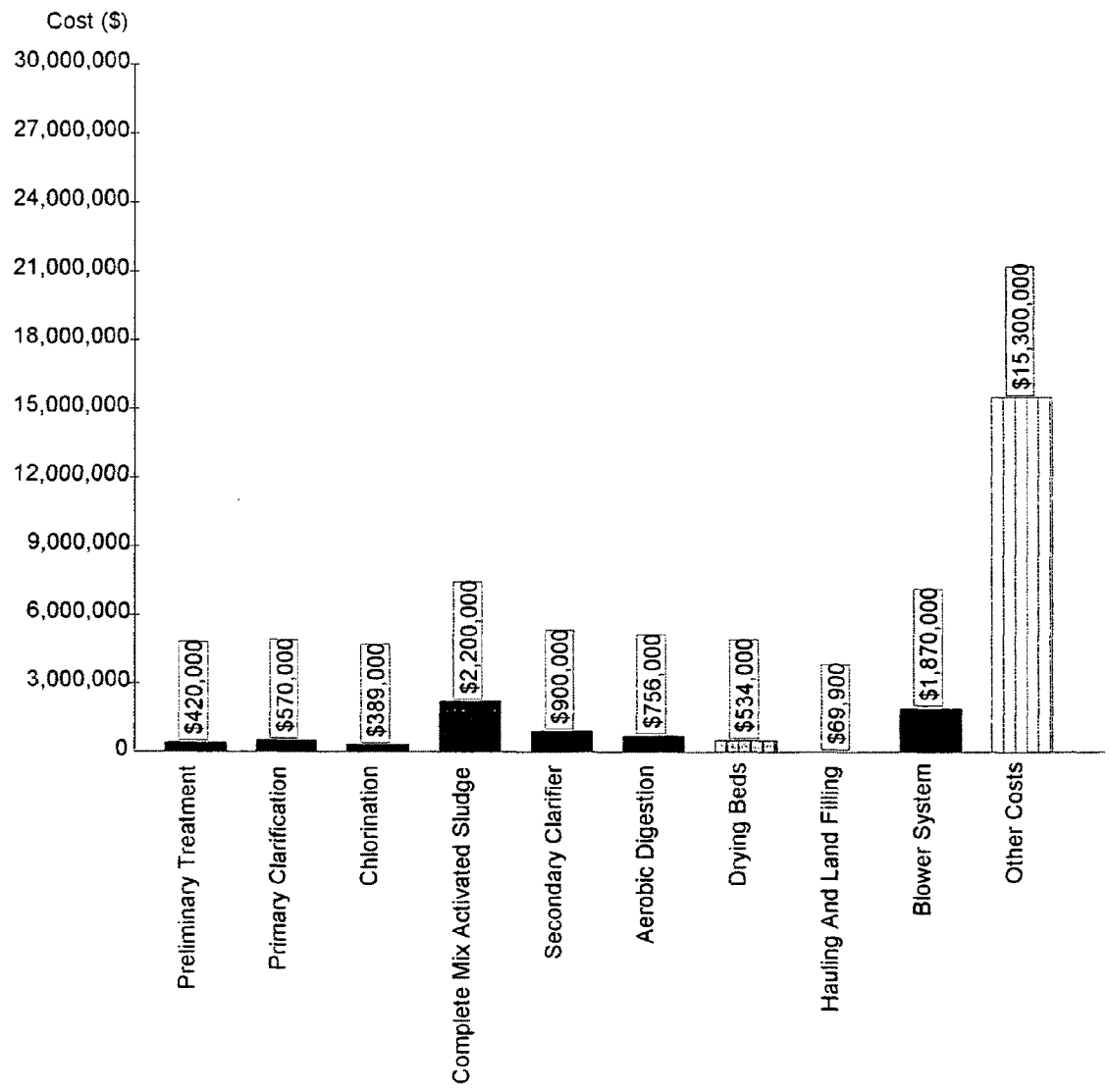
FIG. 2 is a chart of the typical cost of construction of the wastewater treatment plant described in FIG. 1.
Figure 3:
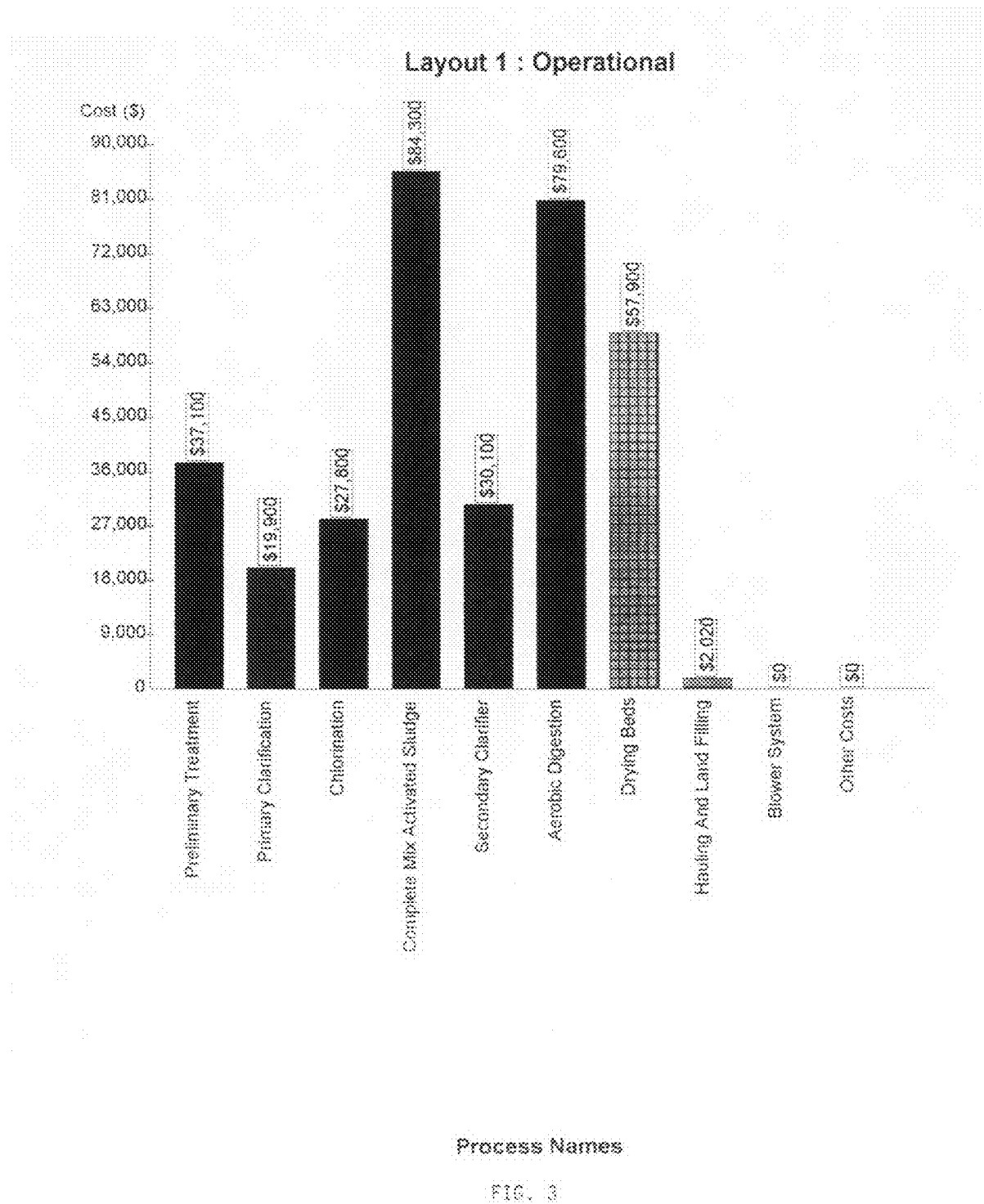
FIG. 3 is a chart of the typical operational costs of the wastewater treatment plant described in FIG. 1.
Figure 4:
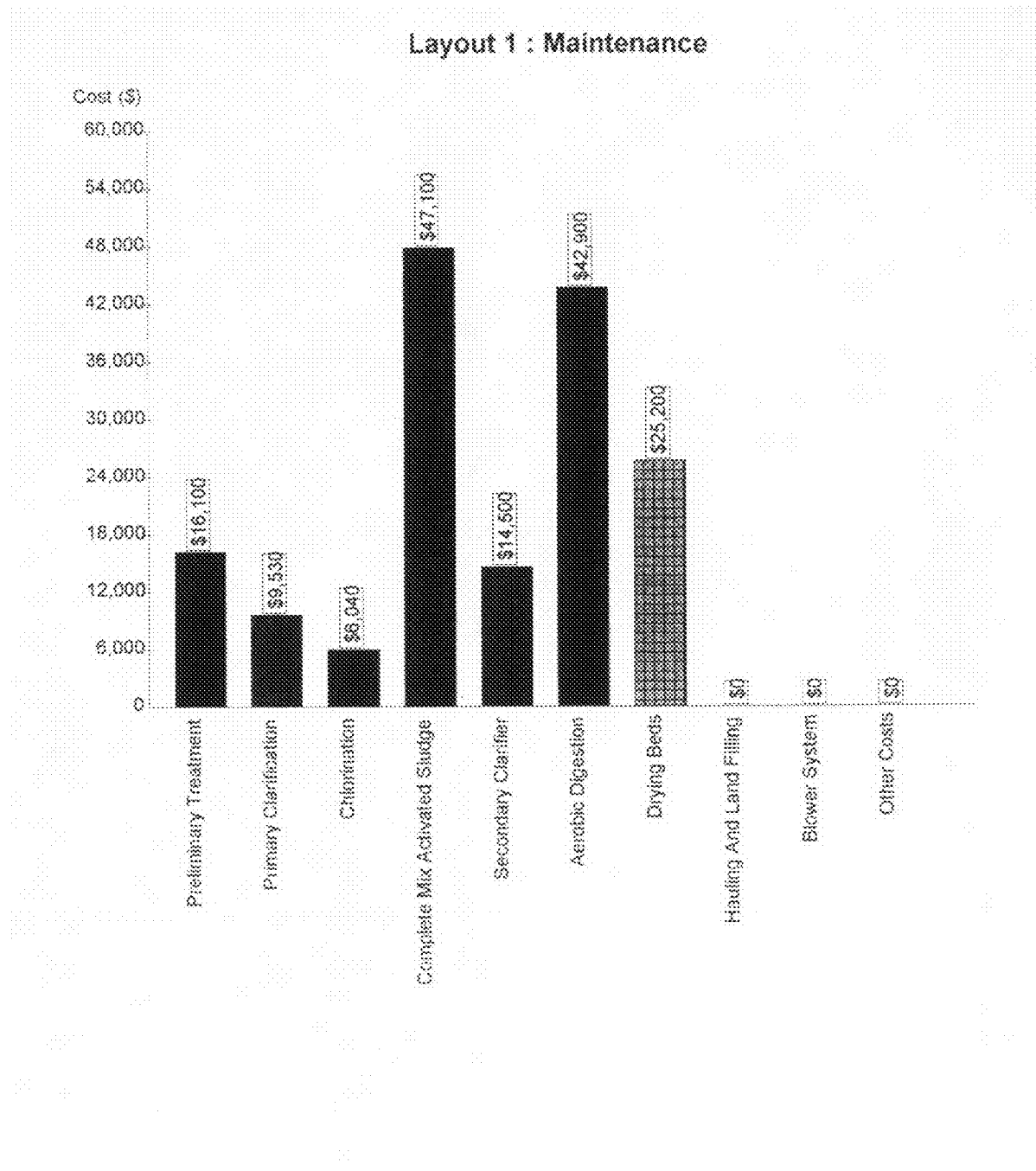
FIG. 4 is a chart of the typical maintenance costs of the wastewater treatment plant described in FIG. 1.

The above influent wastewater inflows are preliminarily screened with bar screens 12 before entering a primary clarifier 14. The primary clarifier 14 directs solids into a complete mix activated chamber 16 associated with a secondary clarifier 18. The mechanically separated solids are then sent to an anaerobic digester 20 for further concentration before disposal into drying beds 22 where the solids are further dried before hauling to a landfill 24. The water liquids from the secondary clarifier 18 are sent to the chlorinator 26 for treatment before discharge. The construction costs of this 10 MGD conventional treatment plant shown in FIG. 1 is $26,300,000 as broken down in FIG. 2. It has a three year construction time, and $419,000/year annual operation costs described in FIG. 3, and $139,000/year annual maintenance costs broken down in FIG. 4.

Figure 5:
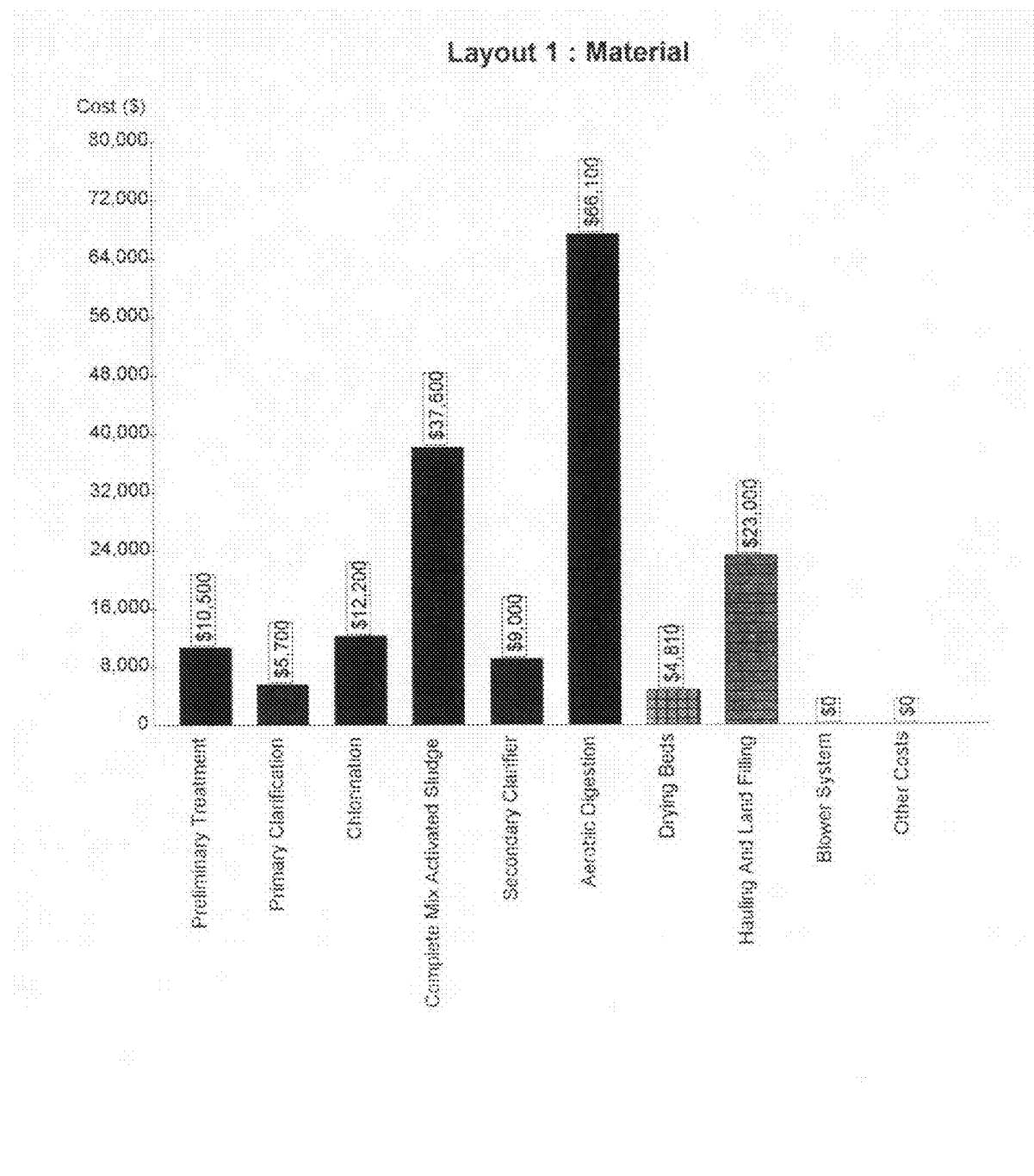
FIG. 5 is a chart of the typical material costs of the wastewater treatment plant described in FIG. 1.

FIG. 5 is a chart of the typical material costs of the wastewater treatment plant described in FIG. 1.

Figure 6:
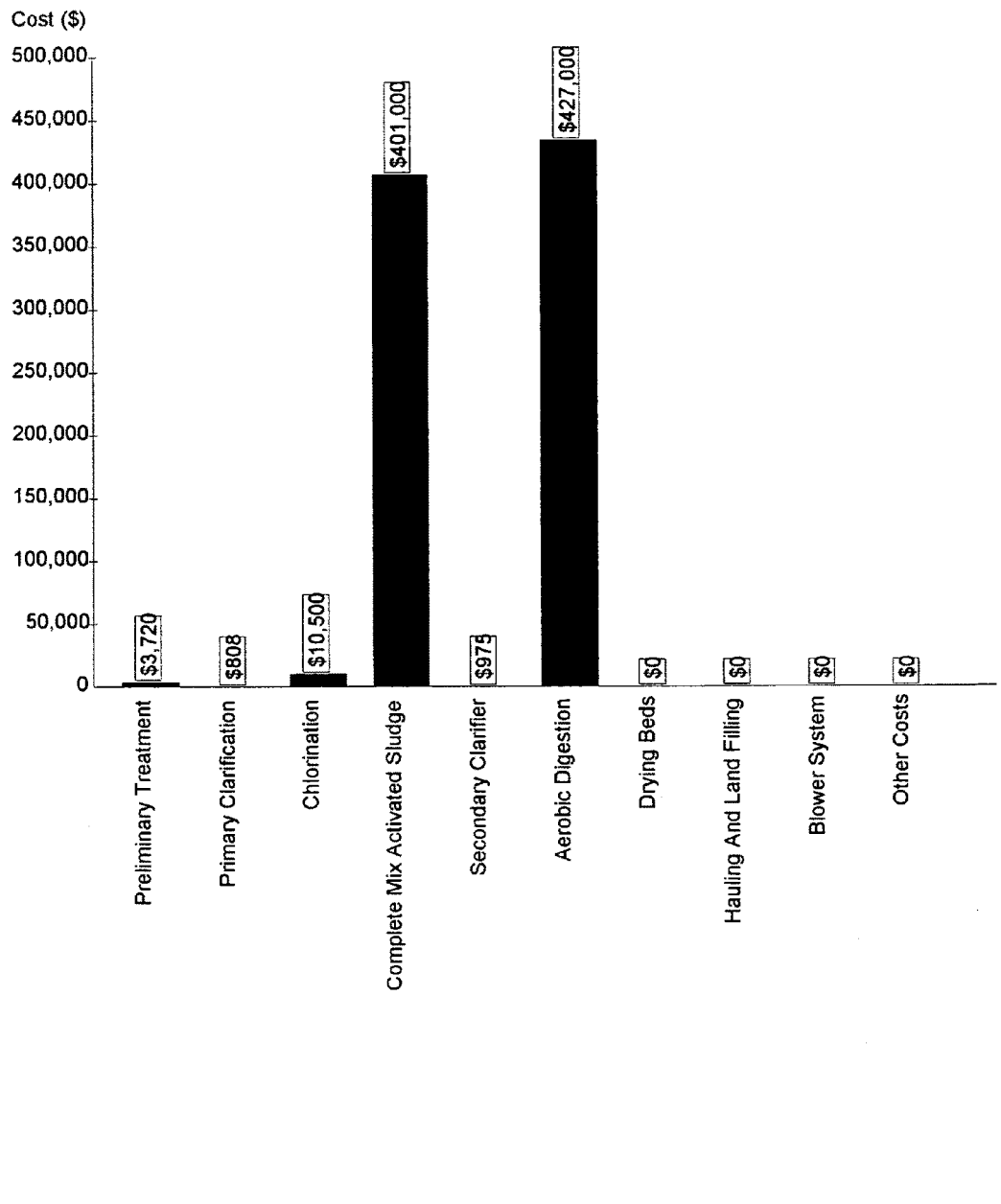
FIG. 6 is a chart of the typical energy costs of the wastewater treatment plant described in FIG. 1.

FIG. 6 is a chart of the typical energy costs of the wastewater treatment plant described in FIG. 1.

Figure 7:
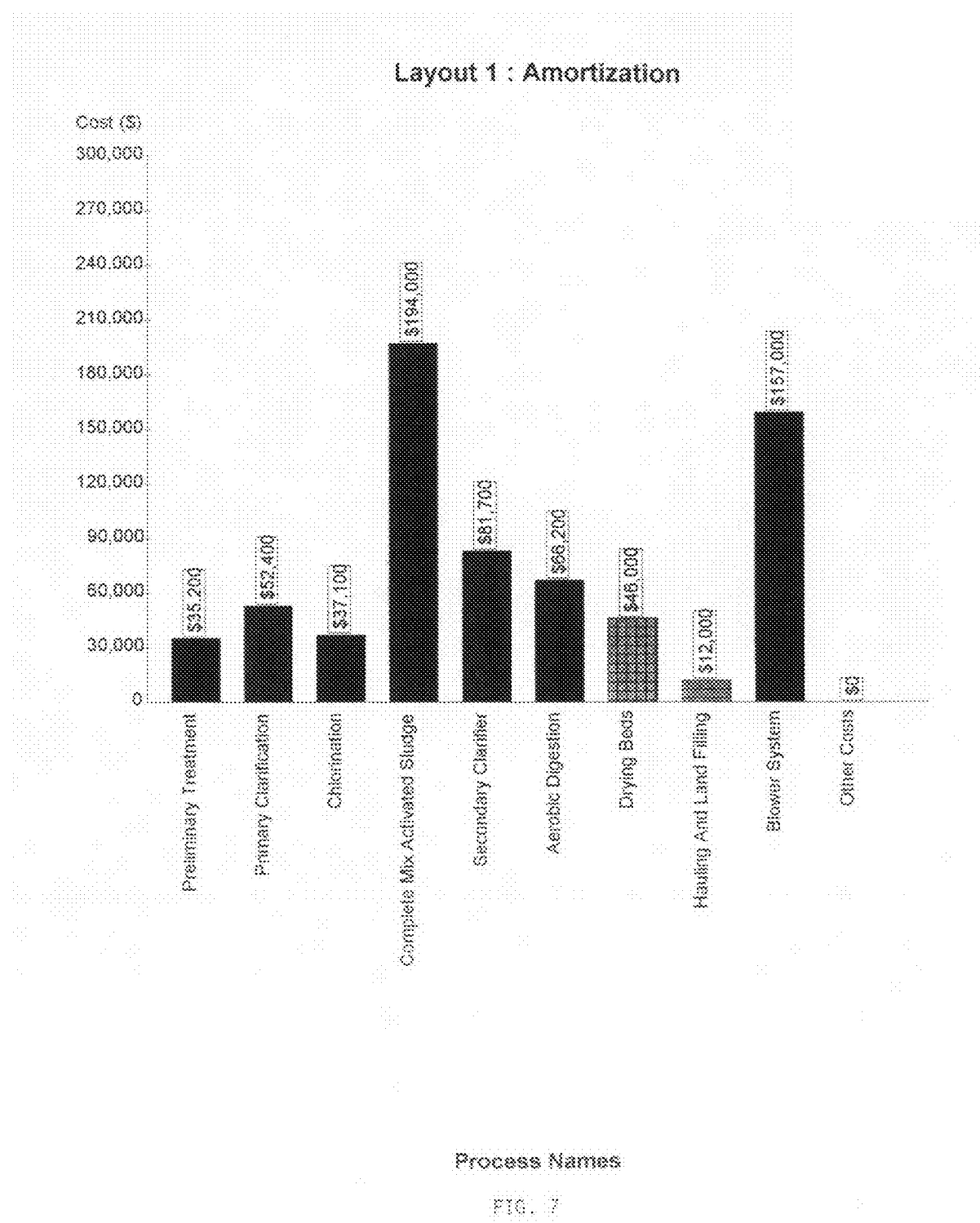
FIG. 7 is a chart of the typical amortization costs of the wastewater treatment plant described in FIG. 1.

FIG. 7 is a chart of the typical amortization costs of the wastewater treatment plant described in FIG. 1 assuming 8% per annum. The above costs assume a Marshall and Swift index of 1080, an Engineering News Research Index of 6240, Pipe Cost Index of 547, user cost index 1 of 100, user cost index 2 of 100, and user cost index 3 of 100.

Figure 8:
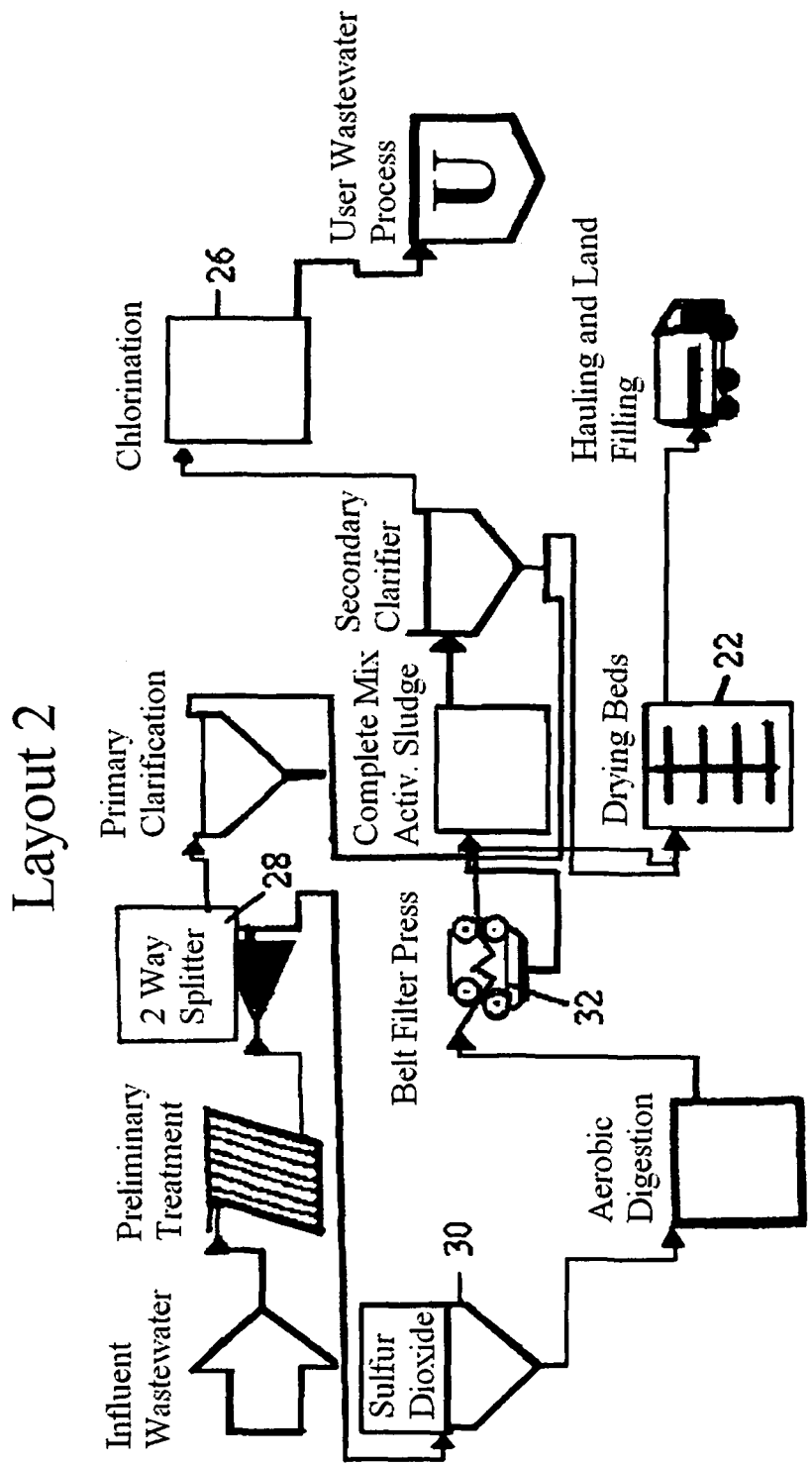
FIG. 8 illustrates the conventional mechanical sludge concentration wastewater treatment plant of FIG. 1 combined with chemical dewatering equipment.

FIG. 8 illustrates the conventional mechanical sludge concentration wastewater treatment plant of FIG. 1 combined with chemical dewatering equipment to meet an anticipated 0.5 MGD/year influent increase. Rather than incur the costs of doubling the capacity of the conventional 10 MGD plant, to determine if a hybrid mechanical/the chemical dewatering wastewater treatment system can be sized and designed, a sample of the incoming sewage influent is chemically treated with $SO_2$ gas to determine if it will also chemically separate and dewater. As part of this testing process, the time of initial separation is also determined. This generally is approximately 20 minutes to one half hour after thorough admixing of the $SO_2$ gas to reduce its pH to approximately 2 for disinfection. The amount of $SO_2$ gas to acidify the wastewater to a pH of approximately 2.2 is then measured (For purposes of illustration, 2000 mg/liter is assumed under a worst case alkaline scenario).

An $SO_2$ gas injection and mixing system is then sized to deliver the amount of gas required. To meet this 0.5 MGD/year demand, modular units are added in phases as needed. Their unit cost is well within the average construction cost of $2.6 M/1 MGD ($26.3M/10 MGD) for the illustrated conventional treatment.

The screened inflows from the bar screens 12 are divided via a splitter 28 to direct a portion of the screen through the present plant layout and a portion for chemical dewater. In the example shown in FIG. 8, multiple treatment reaction vessels 32 sized to provide one half hour dwell time receive the screened influent. (For a 1 MGD double treatment capacity, the vessels must have a combined capacity of 1 MGD/24 hr/D/2 treatments/hr/0.1333686 cu.ft/gal=a combined vessel capacity of approximately 20,833 gallons). Preferably multiple treatment reaction vessels 30 are employed so while one is filling, one is on standby for filling, and two in reserve. The treatment reaction vessels 30 are preferably acid resistant, and can withstand internal stirring. Assuming a cost of $50,000/installed vessel, results in a cost of $200,000.00 for installation of four treatment reaction vessels 30. The cost of piping and pumps (not shown) to fill and drain these reaction vessels is approximately $250,000.00.

Tanked gaseous $SO_2$ is stored and periodically delivered to the site as needed and connected to the gas injectors so minimal site preparation of $10,000 is required. The $SO_2$ gas is associated with a mixer, such as a gas sulphonator with stirrer, or gas jet mixing equipment. The mixer injects gaseous $SO_2$ into the wastewater enclosed in the treatment vessel. Thorough blending for approximately 20 minutes is allowed to effect separation of the solids from the liquids and acid leach heavy metals and phosphates into the liquid fraction. Gas injectors and mixers (not shown) associated with the treatment reaction vessels 30 is included in the approximate budget of $50,000/vessel for a total of $200,000.00 as $SO_2$ is an extremely hydrophilic gas, which readily hydrolyzes without a lot of mixing.

For chemically treating the 0.5 MGD wastewater, under a worst case scenario, requires 2,204.6229 pounds/day or approximately 1 ton of sulfur dioxide at around $230/ton. For a year, the cost of $SO_2$ would be approximately $84,000.00. If this chemically treated wastewater has to be neutralized before discharge, a ton of lime at 18 cents a pound would be required totaling $131,400/year. If elevating the pH for metals separation is further required, another ton of lime would be required under a worst-case scenario for an additional $131,400/year.

As the chemical addition, mixing, and mechanical separation steps are similar to those employed in the existing plant, no extraordinary operating costs would be incurred.

A solids separator costing approximately the same as the primarily clarifier 14 of the conventional wastewater treatment system was assumed although the $SO_2$ treated sludge is self adhering enabling the usage of less costly larger pored screening mesh for the initial separation. The screenings required are tested utilizing filters of different porosities for determining the required weave of polypropylene sheeting. Alternatively, the sheet weave of a typical cotton sheet is usually sufficient to separate the chemically separated and dewatered solids. If the cotton sheet does not have the solids adhere to it, a self-agglomerating sewage is present. Self-agglomerating treated sewage requires minimal screening and can be separated with a polypropylene disposable bag. In short, various sized and types of porous sheeting may be employed to ultimately determine the porosity required for simple separation; thereby avoiding the need for a more expensive conventional belt press or mechanical separator.

After $SO_2$ separation, the treatment reaction vessels 30 are drained into a belt press 32 budgeted under a worst case scenario to handle up to 10 MDG flows at $577,000 to provide additional separation capacity for future expansion. This belt press 32 removes the solids from the liquids of the chemically treated separated liquid/solid mixture. The solids are then delivered to the existing drying beds for further dewatering and ultimate landfill disposal on a reduced volume/weight basis. Thus a hybrid chemical/mechanical wastewater dewatering system can be added within the $2.6M/1 MGD budget constraints based on the average per unit cost of a conventional treatment plant. This is possible as construction times for the chemical dewatering equipment installation are only 6 months because the size of the units required are approximately $1/50^{th}$ to $1/100^{th}$ of that required for wastewater treatment technologies such as that shown employing conventional 24 to 48 hour sedimentation and mechanical separation techniques.

If heavy metals and phosphate removal is required, the cost of liming and adding another belt press to remove the heavy metal hydroxide/phosphate cake is comparable to a conventional alum feed system costing $148,000, when overall materials and chemical costs are considered. Instead of adding alum, the acidified chemically treated wastewater is pH adjusted via the addition of anhydrous or hydrous lime to precipitate the heavy metals as metal hydroxides and insoluble calcium phosphates from the treated wastewater stream. These metal hydroxides are then separated using mechanical separation means. This liming step provides an added benefit of heavy metals removals at a cost comparable to that of adding phosphate removal equipment.

The wastewater control splitter 28 installed after the preliminary bar screens 12 continues to direct the desired volume through the existing plant to optimize its existing operations (as influent wastewater volume generally fluctuates with the regional seasonal precipitation, there is often excess capacity in the existing mechanical wastewater treatment plant during off-peak inflows). Consequently, the splitter 28 continues to direct the optimal inflows through the existing plant and only diverts the excess capacity required for chemical dewatering; thereby optimization use of the present mechanical system, and reducing the volume required for chemical dewatering. Alternatively, the optimal flow into the existing plant may be set at less than full capacity, depending upon the age of the existing plant, temperature, equipment design, influent fluctuations, etc. if chemical dewatering is more cost efficient.

The chemically treated solids remain in the drying beds 22 for continued draining of the chemically separated solids. The chemically separated solids continue to shed water for a period of 12 to 24 hours to achieve a consistency, water and BTU content similar to wood; providing up to a 30% reduced weight, which lowers hauling and landfill costs proportionately. The collected water derived from the drying beds 22 may be land applied, sold, or reinjected into a compatible segment of the conventional wastewater treatment plant. For example, if the concentration of heavy metals and phosphates are not significant, the $SO_2$ acidified chemically treated water from the chemical reaction vessel 30 and drying beds can be combined with that effluent from the chlorinator 24 to remove chlorine contained therein before delivery to the end user as shown in FIG. 8, thus avoiding the cost of additional chlorine removal costs.

As outlined above, the supplemental water benefits, reduced sludge disposal costs, inactivation of pharmaceuticals and chemicals, and reduced size of the reaction vessels, and heavy metals removal provides a blended wastewater treatment cost from this hybrid chemical/mechanical dewatering wastewater treatment plant, which is competitive with other conventional wastewater treatment costs.

In summary, the invention provides a water treatment plant and method particularly suited for wastewater by employing rapid sludge chemical dewatering technology in conjunction with slower conventional mechanical dewatering solids agglomeration and disposal methods to meet cost, environmental permitting restrictions and other siting and permitting limitations for disposal of sewage and wastewater.

Although this specification has made reference to the illustrated embodiments, it is not intended to restrict the scope of the claims. The claims themselves recite those features deemed essential to the invention.

I claim:

1. A hybrid chemical/mechanical water treatment method for inactivating and removing pharmaceuticals, personal care products, perchlorates, heavy metals, solids, phosphates, and chemicals in waters, water inflow streams, and process liquid streams, comprising:
   a. determining the pharmaceuticals, personal care products, perchlorates, heavy metals, solids, and chemicals composition of the waters, water inflow streams and process liquid streams and employing either:
   I. a reduction oxidation chemical treatment comprising:
   a injecting $SO_2$ into a portion of the waters, water inflows streams and/or process liquid streams at a pH that generates sufficient sulfurous acid with free $SO_2$ to condition any solids and waters for disinfection, solids separation, deodorizing waters, water inflow streams and/or process liquid streams, suppressing $CO_2$ emissions from bacteria and destroy those chemicals, which are inactivated by sulfurous acid reduction; wherein the portion is greater than 0% and up to 100%;
   b. holding the waters, water inflow streams, and/or process liquid streams treated by injection of $SO_2$ at a pH between approximately 1.5 and 4.5, depending upon dwell time, until at least one of the following occur:
   i. a conditioned water is produced where any suspended solids agglomerate and dewater by shedding water upon separation and drying,
   ii. dissolved solids and ammonia are sulfurous acid treated resulting in odor reduction,
   iii. $CO_2$ microbial production ceases,
   iv. disinfection occurs,
   v. perchlorate, chlorate, and chromium VI present are inactivated or reduced by sulfurous acid reduction;
   c. mechanically separating and disposing of any solids including sulfate/sulfite precipitates forming a chemically treated liquid fraction,
   .d raising the pH of the chemically treated liquid fraction to inactivate chemicals that are pH inactivated or form precipitates at a pH in excess of 7,
   e separating any precipitates from the chemically treated liquid fraction forming a filtrate, and adjusting the pH of the filtrate for reuse and
   f. testing for remaining chemicals in the filtrate, which are inactivated by oxidation and injecting an oxidizing agent into the filtrate to oxidize said remaining chemicals, or
   II. an oxidation/reduction cycle adding oxidizing agents before step b to the water, water inflow streams and process liquid streams to neutralize or precipitate chemicals inactivated by oxidation and omitting step f.

2. A hybrid chemical/mechanical water treatment method according to claim 1, including identifying any remaining pharmaceuticals and chemicals remaining in the filtrate, adding different reducing and oxidation agents for inactivation, and repeating steps a through f.

3. A hybrid chemical/mechanical water treatment method according to claim 2, wherein, hydrogen peroxide is added to the filtrate to inactivate unreacted chemicals, which require added oxidation.

4. A hybrid chemical/mechanical water treatment method according to claim 2, wherein, a ferrous ion solution is added to the filtrate to inactivate remaining unreacted chemicals, which require added reduction.

5. A hybrid chemical/mechanical water treatment method according to claim 2, wherein a Fenton reagent is added to the filtrate to inactivate remaining unreacted chemicals which require added oxidation and reduction.

6. A hybrid chemical/mechanical water treatment method according to claim 1, wherein heavy metals are removed by raising the pH of the chemically treated liquid fraction via alkalization precipitation to precipitate heavy metals and phosphates for removal.

7. A hybrid chemical/mechanical water treatment method according to claim 1, including exposing the chemically treated liquid fraction to ultraviolet light to inactivate remaining unreacted chemicals, which photo degrade.

8. A hybrid chemical/mechanical water treatment method according to claim 1, including adding activated carbon to the filtrate to adsorb and inactivate remaining unreacted chemicals.

9. A hybrid chemical/mechanical water treatment method for inactivating and removing pharmaceuticals and chemicals in wastewater inflow streams and/or wastewater treatment plant process liquid streams comprising:
 a. constructing a combined water treatment system employing both mechanical and chemical concentration and dewatering technology to effectuate water treatment of waters, wastewater inflow streams and/or wastewater treatment plant process liquid streams;
 b. determining a portion of the waters, water stream inflows and/or wastewater treatment plant process liquid streams to be chemically treated from the combined water treatment system;
 c. diverting for chemical dewatering the portion of the waters, water inflow streams and/or wastewater treatment plant process liquid streams, wherein the portion to be chemically dewatered is greater than 0% and up to 100% based on at least one of the following factors:
  i. treatment costs,
  ii. site constraints for expansion,
  iii present plant capacity to handle future treatment demands,
  iv. eutrophication discharge requirements,
  v. permitting constraints,
  vi. fluctuations in the composition of the treatment plant inflows,
  vii. landfill capacity constraints,
  viii. energy process heat requirements,
  ix. community aesthetic preferences,
  x. time of construction required to construct facilities to meet additional treatment capacity required,
  xi. treated water quality required for sale or discharge,
  xii. concentrated sludge water content required for disposal,
  xiii. odor, heavy metal and pathogen process requirements,
  xiv. chemical treatment wastewater water/solids separation times,
  xv. evaporation losses
  xvi. treatment plant $CO_2$ emissions reductions required;
  xvii. pharmaceuticals, hormones, and other organic wastewater contaminants (OWCs) present in the wastewater,
  xviii. perchlorates and chlorates, Chromium VI and chemical species present in the water,
 d. injecting $SO_2$ into the portion of waters, water inflows streams and/or wastewater treatment plant process liquid streams at a pH that generates sulfurous acid with free $SO_2$ to condition solids and water for disinfection, solids separation, and to deodorize the portion of waters, water inflows-streams and/or wastewater treatment plant process liquid streams, and suppress $CO_2$ emissions and destroy chemical species inactivated by sulfurous acid reduction,
 e. holding the portion of waters, water inflows streams and/or wastewater treatment plant process liquid streams at a pH between approximately 1.5 and 4.5, depending upon dwell time, until at least one of the following occur.
  i. a conditioned water is produced where suspended solids agglomerate and dewater by shedding water upon separation and drying,
  ii dissolved solids and ammonia are sulfurous acid treated resulting in odor reduction,
  iii. $CO_2$ microbial production ceases,
  iv. required disinfection occurs to meet disinfection discharge permit limits,
  v. perchlorate, chlorate, and Chromium VI present in the portion of waters, water inflows streams and/or wastewater treatment plant process liquid streams, which have not previously been inactivated by contact with a content of carbon in the solids, are inactivated by sulfurous acid reduction;
 f. mechanically separating any $SO_2$ treated solids and chemical species adsorbed onto the solids from the water inflow streams and/or wastewater treatment plant process liquid streams forming a chemically treated liquid fraction,
 g. disposing of separated $SO_2$ treated solids in accordance with mechanically dewatered treatment plant disposal processes and/or discharge permit requirements in a manner to prevent exposure to the chemical species;
 h. raising the pH of the chemically treated liquid fraction to inactive chemicals that are inactivated by an elevated pH in excess of 8 and precipitate metal hydroxides for separation leaving a liquid fraction,
 i. removing the metal hydroxides, and
 j. adjusting the pH and disposing of the liquid fraction consistent with a water treatment plant's discharge permit requirements.

10. A hybrid chemical/mechanical water treatment method according to claim 9, including removal of heavy metals from the chemically treated liquid fraction via alkalization precipitation to precipitate heavy metals and phosphates for removal, and mixing the resulting reduced heavy metal and phosphate liquid fraction to the chemically treated fraction and/or the liquid fraction for dilution to comply with discharge permit requirements.

11. A hybrid chemical/mechanical water treatment method according to claim 9, wherein the portion of the chemically treated liquid fraction is treated with calcium or potassium hydroxide.

* * * * *